United States Patent [19]
Lee et al.

[11] Patent Number: 5,905,769
[45] Date of Patent: May 18, 1999

[54] SYSTEM AND METHOD FOR HIGH-SPEED SKEW-INSENSITIVE MULTI-CHANNEL DATA TRANSMISSION

[75] Inventors: Kyeongho Lee, Seoul; Deog-Kyon Jeong, Kyungki-do, both of Rep. of Korea

[73] Assignee: Silicon Image, Inc., Cupertino, Calif.

[21] Appl. No.: 08/646,450

[22] Filed: May 7, 1996

[51] Int. Cl.$^6$ ................................................. H03D 3/24
[52] U.S. Cl. ........................... 375/376; 327/156; 327/261
[58] Field of Search ........................... 327/141, 292–294, 327/298, 156, 261; 331/2, 25; 370/272, 476, 487, 498, 508, 516, 538; 375/371, 376, 377, 374

[56] References Cited

U.S. PATENT DOCUMENTS

| | | | |
|---|---|---|---|
| 4,821,296 | 4/1989 | Cordell | 375/119 |
| 5,008,636 | 4/1991 | Markinson et al. | 331/2 |
| 5,278,873 | 1/1994 | Lowery et al. | 375/371 |
| 5,648,994 | 7/1997 | Kao | 375/376 |

OTHER PUBLICATIONS

A CMOS Serial Link for Fully Duplexed Data Communication, Kyeongho Lee, Sungjoon Kim, Gijung Ahn, and Deog–Kyoon Jeong, 2334c IEICE Transactions on Electronics E78–C(1995) Jun., No. 6, Tokyo, JP; pp. 601–612.

An 800 Mbps Multi–Channel CMOS Serial Link with 3x Oversampling, (May 1, 1995), pp. 451–454.

*Primary Examiner*—Stephen Chin
*Assistant Examiner*—Joseph Roundtree
*Attorney, Agent, or Firm*—Fenwick & West LLP

[57] ABSTRACT

A method and apparatus is disclosed that receives a multi-channel digital serial encoded signal and converting it signal into a synchronized set of binary characters. A charge pump phase-locked loop receives a transmitted reference clock and derives a multi-phase clock from the reference clock. The multi-phase clock is used to control a plurality of multi-bit block assembly circuits. Each assembly circuit receives one channel of the digital signal and produces a multi-bit block or character. The multi-bit block assembly circuit includes an oversampler, a digital phase-locked loop and a byte synchronizer. The oversampler oversamples the received digital signal under control of the multiphase clock and produces a sequence of oversampled binary data. The digital phase-locked loop receives the oversampled data and selects samples from it depending on the skew characteristics of the sample. The byte synchronizer assembles a sequence of selected bits into a bit block, or character. An interchannel synchronizer receives as input the characters produced by each of the multi-bit block assembly circuits, and selectively delays output of the received characters in order to synchronize the characters of each channel with one another.

20 Claims, 16 Drawing Sheets

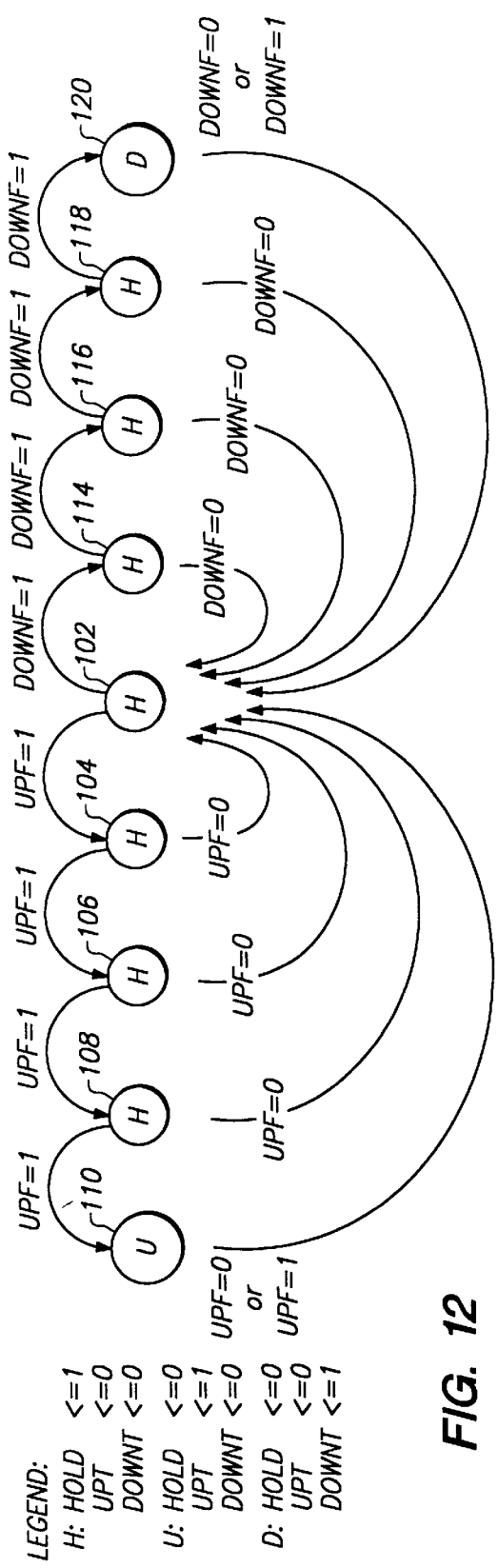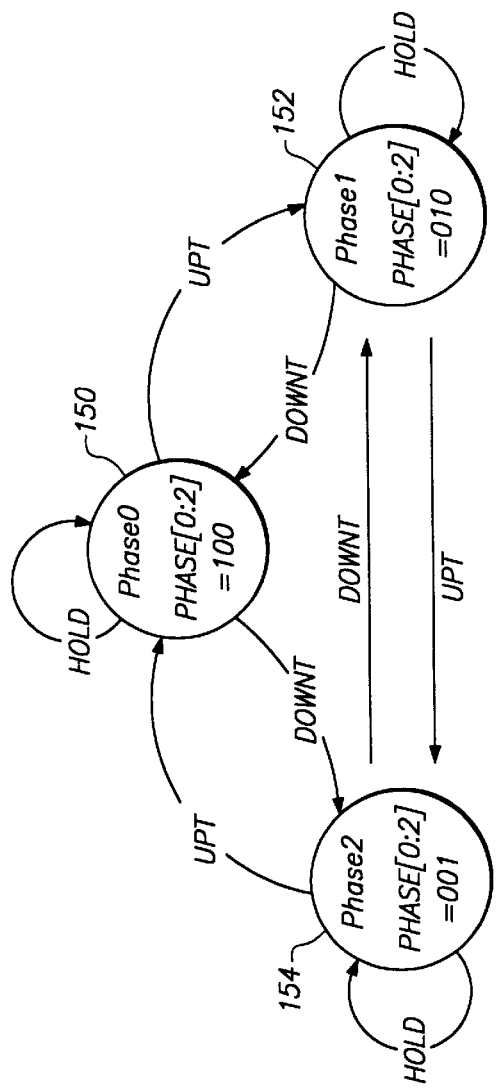
FIG. 12
FIG. 14

| Det. Cell | Q'''[0] | Q'''[1] | Q'''[2] | Q'''[3] | Q'''[4] | Q'''[5] | Q'''[6] | Q'''[7] | Q'''[8] |
|---|---|---|---|---|---|---|---|---|---|
| Det. Cell#0 | Q'''[0] | Q'''[1] | Q'''[2] | Q'''[3] | Q'''[4] | Q'''[5] | Q'''[6] | Q'''[7] | Q'''[8] |
| Det. Cell#1 | Q'''[1] | Q'''[2] | Q'''[3] | Q'''[4] | Q'''[5] | Q'''[6] | Q'''[7] | Q'''[8] | Q'''[9] |
| Det. Cell#2 | Q'''[2] | Q'''[3] | Q'''[4] | Q'''[5] | Q'''[6] | Q'''[7] | Q'''[8] | Q'''[9] | Q'''[10] |
| Det. Cell#3 | Q'''[3] | Q'''[4] | Q'''[5] | Q'''[6] | Q'''[7] | Q'''[8] | Q'''[9] | Q'''[10] | Q'''[11] |
| Det. Cell#4 | Q'''[4] | Q'''[5] | Q'''[6] | Q'''[7] | Q'''[8] | Q'''[9] | Q'''[10] | Q'''[11] | Q'''[12] |
| Det. Cell#5 | Q'''[5] | Q'''[6] | Q'''[7] | Q'''[8] | Q'''[9] | Q'''[10] | Q'''[11] | Q'''[12] | Q'''[13] |
| Det. Cell#6 | Q'''[6] | Q'''[7] | Q'''[8] | Q'''[9] | Q'''[10] | Q'''[11] | Q'''[12] | Q'''[13] | Q'''[14] |
| Det. Cell#7 | Q'''[7] | Q'''[8] | Q'''[9] | Q'''[10] | Q'''[11] | Q'''[12] | Q'''[13] | Q'''[14] | Q'''[15] |
| Det. Cell#8 | Q'''[8] | Q'''[9] | Q'''[10] | Q'''[11] | Q'''[12] | Q'''[13] | Q'''[14] | Q'''[15] | Q'''[16] |
| Det. Cell#9 | Q'''[9] | Q'''[10] | Q'''[11] | Q'''[12] | Q'''[13] | Q'''[14] | Q'''[15] | Q'''[16] | Q'''[17] |
| Det. Cell Output | A[0] | A[1] | A[2] | A[3] | A[4] | A[5] | A[6] | A[7] | A[8] |

| Det. Cell | | | | | | | | | |
|---|---|---|---|---|---|---|---|---|---|
| Det. Cell#0 | Q'''[10] | Q'''[11] | Q'''[12] | Q'''[13] | Q'''[14] | Q'''[15] | Q'''[16] | Q'''[17] | Q'''[18] |
| Det. Cell#1 | Q'''[11] | Q'''[12] | Q'''[13] | Q'''[14] | Q'''[15] | Q'''[16] | Q'''[17] | Q'''[18] | Q'''[19] |
| Det. Cell#2 | Q'''[12] | Q'''[13] | Q'''[14] | Q'''[15] | Q'''[16] | Q'''[17] | Q'''[18] | Q'''[19] | Q'''[0] |
| Det. Cell#3 | Q'''[13] | Q'''[14] | Q'''[15] | Q'''[16] | Q'''[17] | Q'''[18] | Q'''[19] | Q'''[0] | Q'''[1] |
| Det. Cell#4 | Q'''[14] | Q'''[15] | Q'''[16] | Q'''[17] | Q'''[18] | Q'''[19] | Q'''[0] | Q'''[1] | Q'''[2] |
| Det. Cell#5 | Q'''[15] | Q'''[16] | Q'''[17] | Q'''[18] | Q'''[19] | Q'''[0] | Q'''[1] | Q'''[2] | Q'''[3] |
| Det. Cell#6 | Q'''[16] | Q'''[17] | Q'''[18] | Q'''[19] | Q'''[0] | Q'''[1] | Q'''[2] | Q'''[3] | Q'''[4] |
| Det. Cell#7 | Q'''[17] | Q'''[18] | Q'''[19] | Q'''[0] | Q'''[1] | Q'''[2] | Q'''[3] | Q'''[4] | Q'''[5] |
| Det. Cell#8 | Q'''[18] | Q'''[19] | Q'''[0] | Q'''[1] | Q'''[2] | Q'''[3] | Q'''[4] | Q'''[5] | Q'''[6] |
| Det. Cell#9 | Q'''[19] | Q'''[0] | Q'''[1] | Q'''[2] | Q'''[3] | Q'''[4] | Q'''[5] | Q'''[6] | Q'''[7] |
| Det. Cell Output | B[0] | B[1] | B[2] | B[3] | B[4] | B[5] | B[6] | B[7] | B[8] |

FIG. 19

SYSTEM AND METHOD FOR HIGH-SPEED SKEW-INSENSITIVE MULTI-CHANNEL DATA TRANSMISSION

BACKGROUND

1. Technical Field

The invention relates to a system and method for producing a set of synchronized binary signals from a multi-channel serial signal, and, more particularly, for receiving multi-channel serial signals, correcting for skew in the sampling of each serial signal, and synchronizing binary characters in a channel with their counterparts in other channels.

2. Background and Objects of the Invention

One problem in sampling a serial data stream is the problem of clock skew. Clock skew occurs when a recovered clock signal, whose phase is used to determine the time at which to sample the serial signal, is out of phase with the serial signal. This can occur, for example, if the wire or other medium carrying the clock signal is of a different length or density from the wire or other medium carrying the serial data signal.

One way of dealing with a skew condition is to oversample the received serial signal; that it, so sample the received signal more than one time during the expected duration of each bit signal. By selecting multiple samples, a skew condition can be detected and, by using the values captured in the majority of the oversamples, and ignoring minority spurious values captured as a result of skew. A problem with this approach, however, is that it fails for large skews, where a majority of oversamples may actually be of an adjacent transmitted bit rather than of the intended bit. This is particularly likely to occur when a small skew has been propagated over a length of time, resulting in a large accumulated skew. It is therefore desirable to have a means of detecting occurrences of skew and adjusting oversampling to compensate for the observed skew and eliminate the skew in subsequent oversamples.

It is further desirable to be have a means of combining multiple serial signals into a single composite signal, adjusting for any variations in arrival time of each of the serial signals.

SUMMARY OF THE INVENTION

The present invention is directed to a method and apparatus for receiving a multi-channel digital serial encoded signal and converting the received signal into a synchronized set of binary characters. In one aspect of the invention, a charge pump phase-locked loop receives a transmitted reference clock and derives a multi-phase clock from the reference clock. The multi-phase clock is used to control a plurality of multi-bit block assembly circuits. Each assembly circuit receives one channel of the digital signal and produces a multi-bit block or character. The multi-bit block assembly circuit includes an oversampler, a digital phase-locked loop and a byte synchronizer. The oversampler oversamples the received digital signal under control of the multiphase clock and produces a sequence of oversampled binary data. The digital phase-locked loop receives the oversampled data and selects samples from it depending on the skew characteristics of the sample. The byte synchronizer assembles a sequence of selected bits into a bit block, or character. An interchannel synchronizer receives as input the characters produced by each of the multi-bit block assembly circuits, and selectively delays output of the received characters in order to synchronize the characters of each channel with one another.

In another aspect of the invention, a digital phase-locked loop includes a phase aligning window, responsive to a phase selection signal value, that receives oversampled binary signals and produces a set of phase-aligned binary signals according to the value of the phase selection signal. A phase detection logic circuit receives the phase-aligned binary signals and produces a phase detection signal that characterizes the phase of the received signal. A digital loop filter accordingly produces a set of phase adjustment recommendation signals, which selectively recommend a phase correction. A phase-adjusting finite state machine receives the phase-adjustment recommendation signal and derives a phase selection signal that is fed back to the phase aligning window.

In another aspect of the invention, the phase condition of an oversampled binary signal is detected. A phase detection logic circuit receives as input a plurality of binary signals and produces a phase detection signal. The phase detection logic circuit includes a plurality of phase-detecting cells that produce a phase signal having a logic value indicative of the phase of the received signal. The phase signal is presented to an up-down decision logic circuit, which produces a composite phase signal indicating whether the received binary signal is consistently out of phase in the same direction.

In another aspect of the invention, a phase of an oversampled binary signal is adjusted. A digital loop filter receives a series of composite phase signals and produces a tristate phase adjustment recommendation signal indicating whether the oversampled signal is out of phase in a first direction, out of phase in a second direction, or in phase. A phase-adjusting finite state machine processes the tristate signal and produces a phase adjustment signal which may be used by a phase adjustment circuit to adjust the phase of further received signals.

In another aspect of the invention, a plurality of multi-bit characters received on multiple channels are synchronized with one another. A set of preamble signals are detected by means of a predetermined out-of-band preamble character, and used to control a data enable signal that indicates whether a character being processed is a preamble character or a data character. The enable signals of each channel are used to selectively delay output of a received data character until the preamble period has ended for all channels, thereby assuring synchronization among the channels.

Additional features of the invention will become apparent upon examination of the description that follows, particularly with reference to the accompanying drawings.

DESCRIPTION OF THE DRAWINGS

The aspects of the present invention will be better understood by reference to the drawings, in which:

FIG. 12 depicts a state diagram for a digital loop filter of the present invention;

FIG. 14 depicts a state diagram for a finite state machine of the present invention;

FIG. 19 depicts the mapping performed by a mapping block in a detection cell;

DETAILED DESCRIPTION

Introduction

Figure 1A:
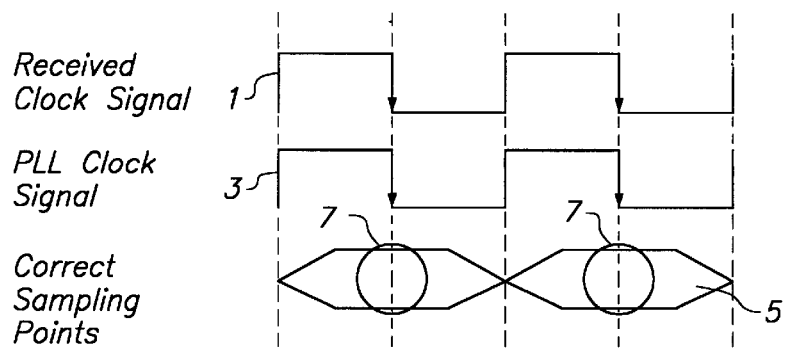
FIG. 1A depicts a conventional sampling of a serial data stream, without significant clock skew.

FIG. 1A depicts a conventional sampling of a serial data stream, without significant clock skew. Received clock signal 1 indicates a clock signal recovered from an accompanying serial line. PLL clock signal 3 indicates a clock signal generated by a phase locked loop in response to received clock signal 1. Data is sampled according to the PLL clock signal 3. Conventionally, a sample of serial signal 5 is made with each falling edge of PLL clock signal 3. FIG. 1A depicts the PLL clock signal 3 in exact synchronization with received serial signal 5, as shown by correct sampling points 7.

Figure 1B:
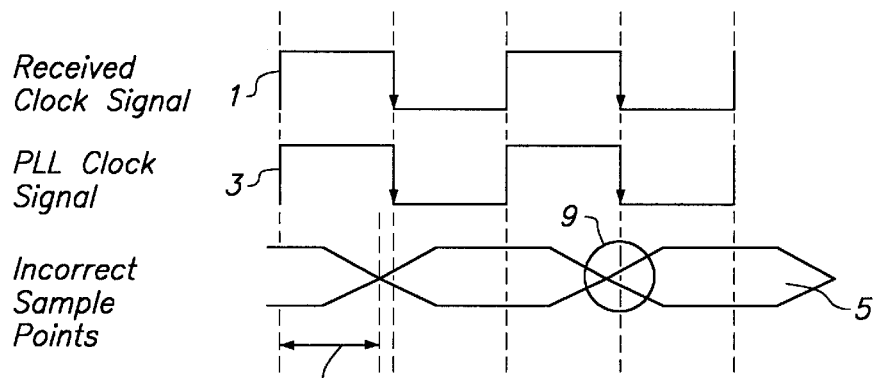
FIG. 1B depicts a conventional sampling of a serial data stream, with a significant clock skew condition.

FIG. 1B depicts the same conventional sampling of a serial data stream, with a significant clock skew condition. As in FIG. 1A, received clock signal 1 indicates a clock signal recovered from an accompanying serial line. PLL clock signal 3 indicates a clock signal generated by a phase locked loop in response to received clock signal 1. Data is sampled according to the PLL clock signal 3. However, in the case depicted in FIG. 1B, the PLL clock signal 3 is out of phase from serial signal 5. As a result, serial signal 5 is not sampled near the center of the bit, but is instead sampled at incorrect sample point 9. Incorrect sample point 9 is some distance, represented by skew distance 11, from the optimal sampling point. As a result serial signal 5 may be incorrectly measured as having a value different from that of the transmitted value.

Figure 2:
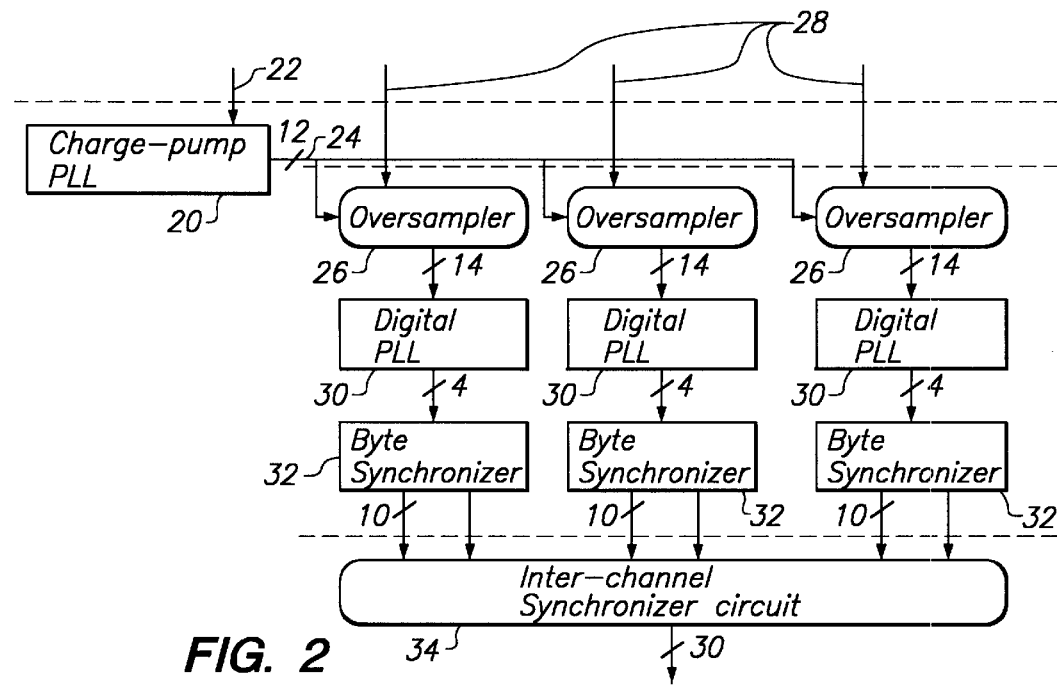
FIG. 2 depicts an overview of an embodiment of the data recovery system of the present invention.

FIG. 2 depicts an overview of an embodiment of the data recovery system of the present invention. Charge-pump phase-locked loop (PLL) 20 receives a transmitted reference clock 22. Concurrent with the transmission of reference clock 22, one or more multi-bit block assembly circuits 25 receive as input transmitted serial data 28, and produce as output a skewless data character. Optionally, each skewless data character is provided as input to an inter-channel synchronization circuit 34. The inter-channel synchronization circuit 34 selectively delays one or more of the received skewless characters and produces as output a synchronized multi-channel signal comprising each of the received skewless characters. The embodiment depicted in FIG. 2 uses multi-bit block assembly circuits to produce a three-channel composite signal, and is therefore particularly well-suited to the transmission of a video signal employing a composite RGB signal made up of a signal for each of the Red, Green and Blue signals used to compose the RGB signal.

Each multi-bit block assembly circuit 25 comprises an oversampler 26, a digital phase-locked loop (DPPL) 30 and a byte synchronizer 32, as is more fully disclosed herein.

Oversampler Operation

In operation, oversamplers 26 receive as input transmitted serial data 28, which is transmitted at a predetermined number of bits per second (bps). The frequency of transmitted reference clock 22 and the bps of transmitted serial data 28 is chosen so that the number of bits of transmitted serial data 28 transmitted in one duty cycle of reference clock 22 is equal to the number of bits in a unit to be decoded, ordinarily one character. For example, if the invention is implemented to decode a unit of one ten-bit character at a time, and reference clock 22 has a frequency of N MHz, serial data 28 will be transmitted at the rate of 10×N Mbps. For example, if the received data rate is 650 Mbps, reference clock 22 will have a frequency of 65 MHz.

In response to reference clock 22, PLL 20 generates a multiphase clock signal 24. Multiphase clock signal 24 has a frequency and phase such that a plurality of clock edges are asserted in the amount of time needed for the receipt of each bit received from transmitted serial data 28. For example, a multiphase clock signal 24 having a phase of 12 and having a frequency of 2.5×N MHz enables three clock edges to be asserted for each bit of received serial data 28.

Figure 3:
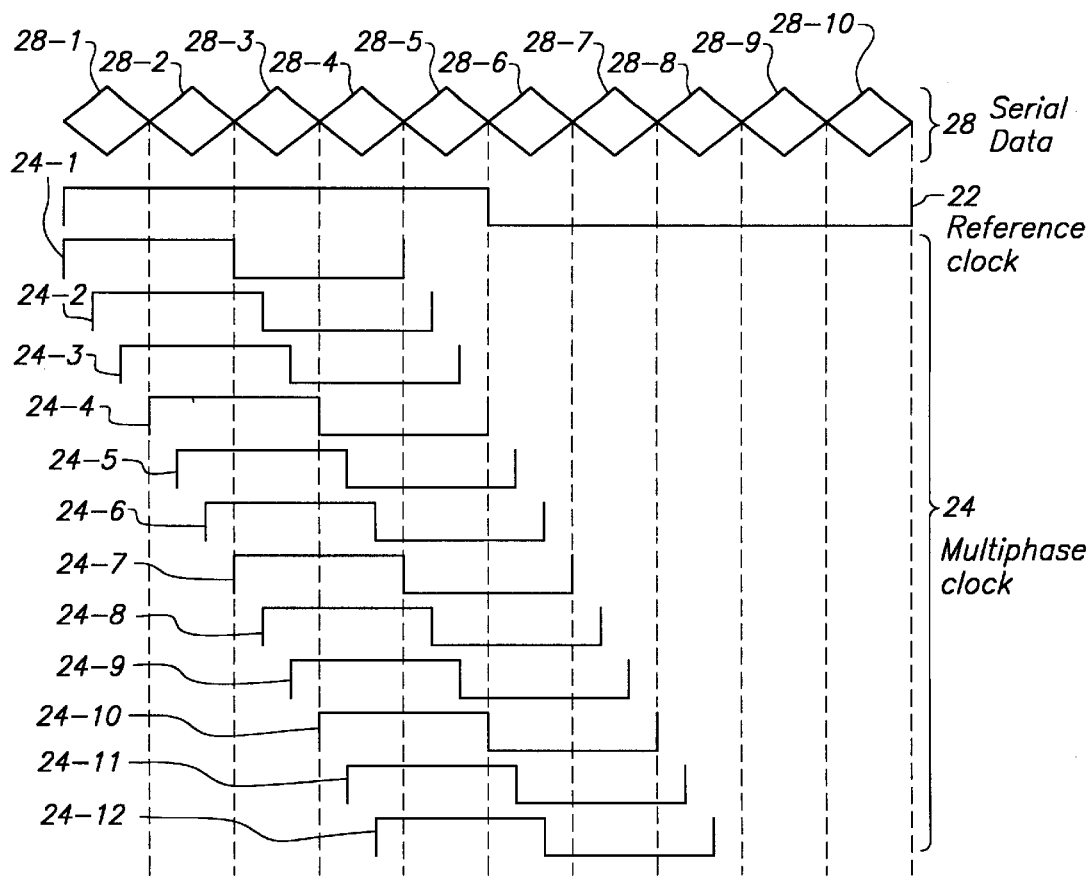
FIG. 3 depicts the relationships among received serial data, a reference clock and a multiphase clock.

FIG. 3 depicts the relationships among received serial data 28, reference clock 22 and multiphase clock 24. The depicted embodiment is of a reference clock 22 having a frequency of NMHz, serial data 28 transmitted at 10×N Mbps, and multiphase clock 24 having a phase of 12 and a frequency of 2.5M Hz. Serial data 28 comprises a plurality of 10 serial data bits 28-1 through 28-10. Multiphase clock 24 comprises a plurality of clock signals 24-1 through 24-12, each of which clock signals has a frequency of 2.5M Hz, and each of which is equally spaced in phase from its adjacent clock signal. The frequencies of clock signals 24-1 through 24-12 are such that a predetermined number, three in the example, of rising edges of the multiphase clock 24 occur during each bit 28-1 through 28-10. For example, rising edges of clocks 24-1, 24-2 and 24-3 occur during the duration of bit 28-1; rising edges of clocks 24-4, 24-5 and 24-6 occur during the duration of bit 28-2; and so on.

Figure 4:
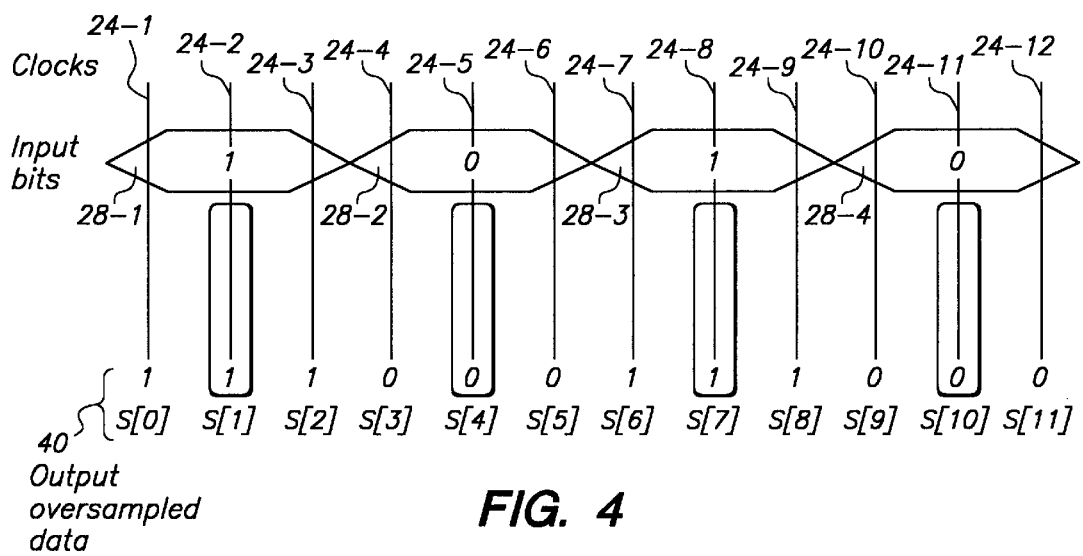
FIG. 4 depicts an example of the operation of the oversampler the present invention for a cycle of each phase of a multiphase clock.

FIG. 4 depicts an example of the operation of oversampler 26 for a cycle of each of clock 24-1 through 24-12. The example depicted shows four input bits, bits 28-1 through 28-4, being sampled in accordance with clocks 24-1 through 24-12, producing as output oversampled data 40, designated as 12 binary values S[0:11]. In the example depicted, bits 28-1 and 28-3 each have a value of '1' and bits 28-2 and 28-4 each have a value of '0'. Bit 28-1 is sampled according to clocks 24-1, 24-2 and 24-3 for a total of three samples, producing oversampled data s[0], S[1], and S[2]. Bit 28-2 is sampled according to clocks 24-4, 24-5 and 24-6 for a total of three samples, producing oversampled data S[3], S[4], and S[5]. Bit 28-3 is sampled according to clocks 24-7, 24-7 and 24-9 for a total of three samples, producing oversampled data S[6], S[7], and S[8]. Bit 28-4 is sampled according to clocks 24-10, 24-11 and 24-12 for a total of three samples, producing oversampled data S[9], S[10], and S[11].

Figure 5:
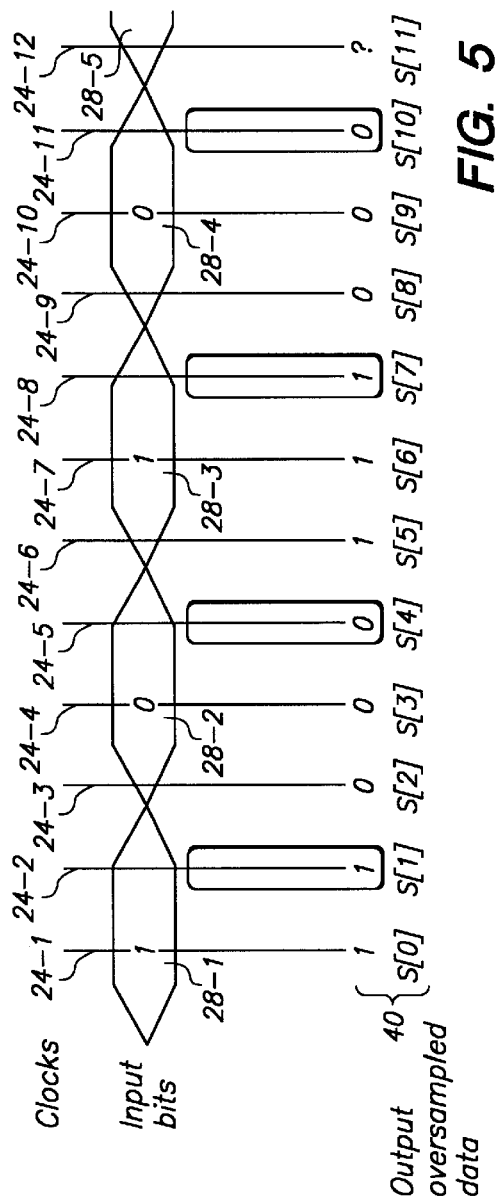
FIG. 5 depicts the operation of the oversampler for a cycle of a multiphase clock in which samples are significantly out of synchronization.

It will be noted that the example depicted shown in FIG. 4 assumes that clocks 24-1 through 24-12 are in perfect synchronization with bits 28-1 through 28-4. As a result, each of the values of sample sets S[0:2], S[3:5], S[6:8] and S[9:11] are correctly sampled. In contrast, FIG. 5 depicts the operation of the oversampler 26 for a cycle in which clock 24-1 through 24-12 are significantly out of synchronization with bits 28-1 through 28-4. It will be noted that sampled bits S[0] and S[1] sample the correct received bit 28-1, yielding a correctly sampled value '1', but that sampled bit S[2] samples incorrect input bit 28-2 rather than correct received bit 28-1, resulting in an erroneous value of '0'. Likewise, sampled bits S[3:4], S[6:7] and S[9:10] correctly sample received bits 28-2, 28-3 and 28-4 respectively. However, sampled bit S[5] erroneously samples received bit 28-3, sampled bit S[8] erroneously samples received bit 28-4, and sampled bit S[11] erroneously samples received bit 28-5. Despite the errors in sampling induced by the lack of synchronization, it will be noted that the center oversampled bit in each group of three (e.g., S[1], S[4], S[7] and S[10] of groups S[0:2], S[3:5], S[6:8] and S[9:11], respectively) are correctly sampled despite the skew.

Digital Phase Locked Loop Operation Overview

Figure 6:
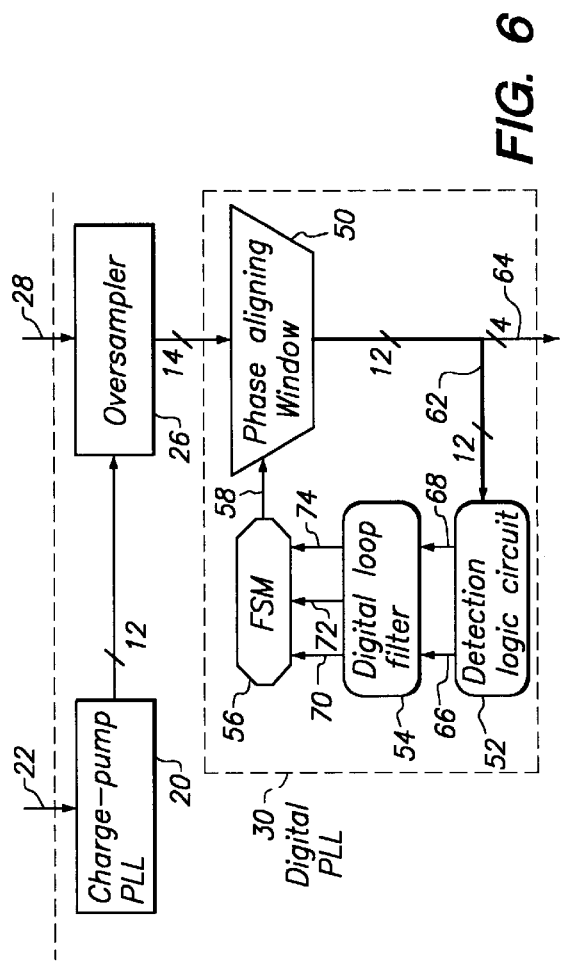
FIG. 6 depicts the interaction of the oversampler and a digital phase-locked loop.

FIG. 6 depicts the interaction of oversampler 26 and DPLL 30, and an overview of the operation of DPLL 30. Following oversampling, oversampler 26 provides a 14-bit signal 60 as output to DPLL 30. the 14-bit signal comprises S[0:11] and two additional bits. One additional bit is the last bit sampled from the previous operation of oversampler 26 (i.e., the value sampled for S[11] in the previous sampling iteration), denoted as S'[11]. The other additional bit is the first bit sampled from the next operation of oversampler 26 (i.e., the value that will be used for S[0] in the next sampling interation), denoted as S"[0]. in order to obtain the bit value for S"[0], the output of oversampler 26 is delayed for one phase of multiphase clock 24.

DPPL 30 comprises a phase aligning window 50, a phase detection logic circuit 52, a digital loop filter 54, and a phase-aligning finite state machine (FSM) 56. Phase aligning window 50 selects 12 of the 14 bits S'[11], S[0:11] and S"[0] according to the value of a phase selection signal 58 generated by FSM 56 as more fully describe herein, thereby producing a 12-bit signal 62. In addition, phase aligning window 50 derives a 4-bit subset signal from 12-bit signal 62, and provides 4-bit subset signal 64 as input to byte synchronization circuit 32. Phase selection logic circuit 52 inspects 12-bit signal 62 and determines whether the signal indicates an out-of-phase condition. Phase selection logic circuit 52 asserts as output two phase detection signals, UPF 66 and DOWNF 68. Phase detection signals UPF 66 and DOWNF 68 are provided as input to digital loop filter 54. Digital loop filter 54 determines whether a sufficient number of consecutive phase conditions of like polarity have been detected, and generates a set of three phase correction recommendation signals denoted as UPT 70, HOLD 72 and DOWNT 74. FSM 56 takes as input signals UPT 70, HOLD 72 and DOWNT 74 and generates a phase selection signal 58, which is used by phase aligning window 50 as noted above.

The operation and interactions of the various component parts of DPPL 30 will be understood with reference to the detailed description of each component as set forth herein.

Phase Aligning Window

Figure 7A:
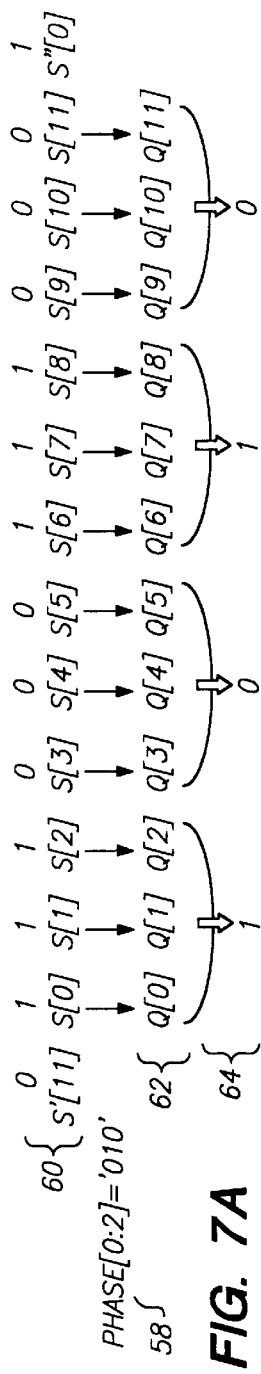
FIGS. 7A through 7D depict the operation of the phase aligning window of the present invention.
Figure 7B:
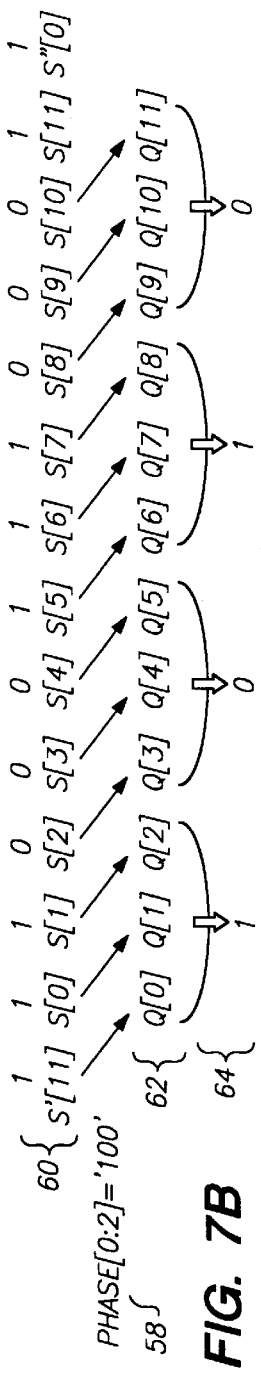
Figure 7C:
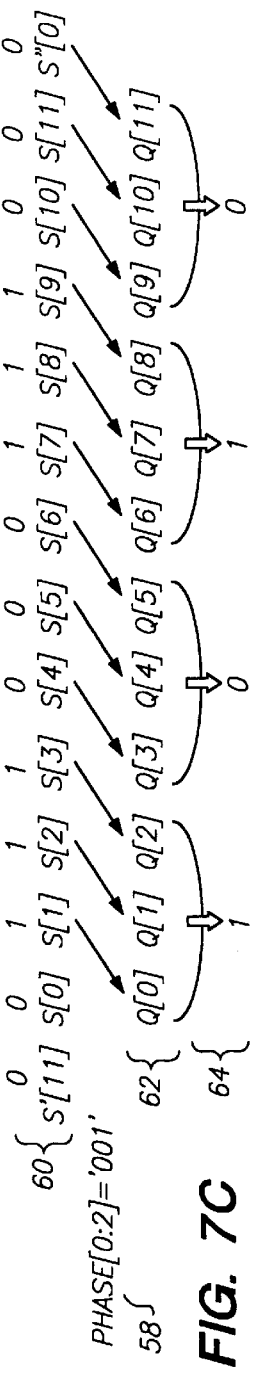

FIGS. 7A through 7C depict the normal operation of the phase aligning window 50. As previously described, 14-bit input signal 50 comprises bit S'[11], twelve bits S[0:11] and bit S"[0]. Phase aligning window selects 12 bits from 14-bit input signal 60 to form 12-bit signal 62 denoted as bits Q[0:11]. The twelve bits are selected based on the value of phase selection signal 58. Phase selection signal 58 has one of three values: '010' indicates that no skew has been detected; '100' indicates that a low skew has been detected; and '001' indicates that a high skew has been detected. It will be noted that, because phase selection signal 58 has only three values, it may be alternatively represented by a two-bit signal. However, the use of one bit for each skew condition has an advantage of simplifying the digital circuitry needed to implement the invention.

Following the production of 12-bit signal Q[0:11] 62, the 12-bit signal will be analyzed for skew to produce a new value for phase selection signal 58 as disclosed more fully herein, and the results will be used in future iterations of phase aligning window 50. In addition, phase aligning window 58 selects bits Q[1, 4, 7, and 10] and asserts those for bits as 4-bit signal 64.

FIG. 7A depicts the normal operation of phase aligning window 50 when 14-bit input signal 60 is without skew. Phase selection signal 58 has a value of '010', indicating that no sampling skew has been detected, and that therefore no sampling skew needs to be corrected. As a result, phase aligning window 50 selects bits S[0:11] and passes the resulting output as 12-bit signal 62. That is, Q[N] is set to the value of S[N] for each N in the range 0:11.

FIG. 7B depicts the normal operation of phase aligning window 50 when 14-bit input signal 60 is expected to be skewed low. Phase selection signal 58 has a value of '100', indicating that a low skew has been detected, and that therefore a low skew needs to be corrected. As a result, phase aligning window 50 selects bit S'[11] and eleven bits S[0:10] and passes the resulting output as 12-bit signal 62. That is, Q[0] is set to the value of S'[11], and Q[N] is set to the value of S[N-1] for each N in the range 1:11, thereby compensating for the detected skew.

FIG. 7C depicts the normal operation of phase aligning window 50 when 14-bit input signal 60 is expected to be skewed high. Phase selection signal 58 has a value of '001', indicating that a high skew has been detected, and that therefore a high skew needs to be corrected. As a result, phase aligning window 50 selects eleven bits S[1:11] and bit S"[0] and passes the resulting output as 12-bit signal 62. That is, Q[N] is set to the value of S[N+1] for each N in the range 0:10, and Q[11] is set to the value of S"[0], thereby compensating for the detected skew.

Figure 7D:
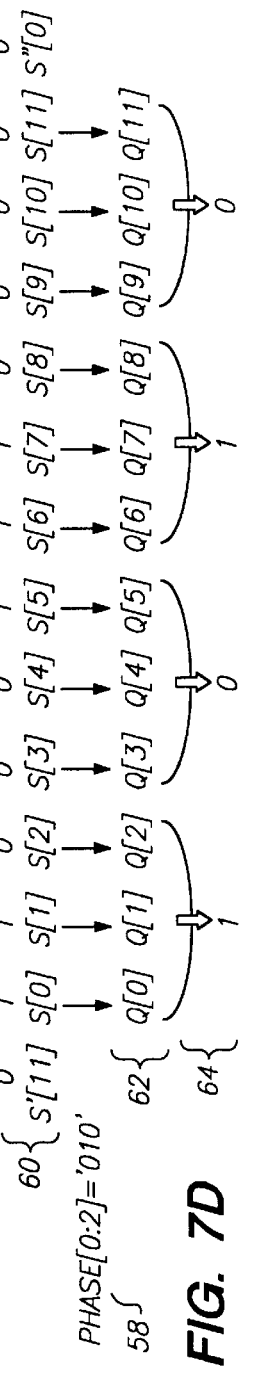

FIG. 7D depicts the operation of phase aligning window 50 when 14-bit input signal 60 is not expected to be skewed, but in fact is skewed low. Phase selection signal 58 has a value of '010', indicating that no sampling skew has been detected, and that therefore no sampling skew needs to be corrected. As a result, as in FIG. 7A, phase aligning window 50 selects bits S[0:11] and passes the resulting output as 12-bit signal 62. Because phase aligning window 58 did not correct for the skew condition, the skew condition is retained in 12-bit signal 62 for further analysis as more fully disclosed herein. It will be noted that despite the skew, 4-bit signal 64 is correctly recovered.

Figure 8:
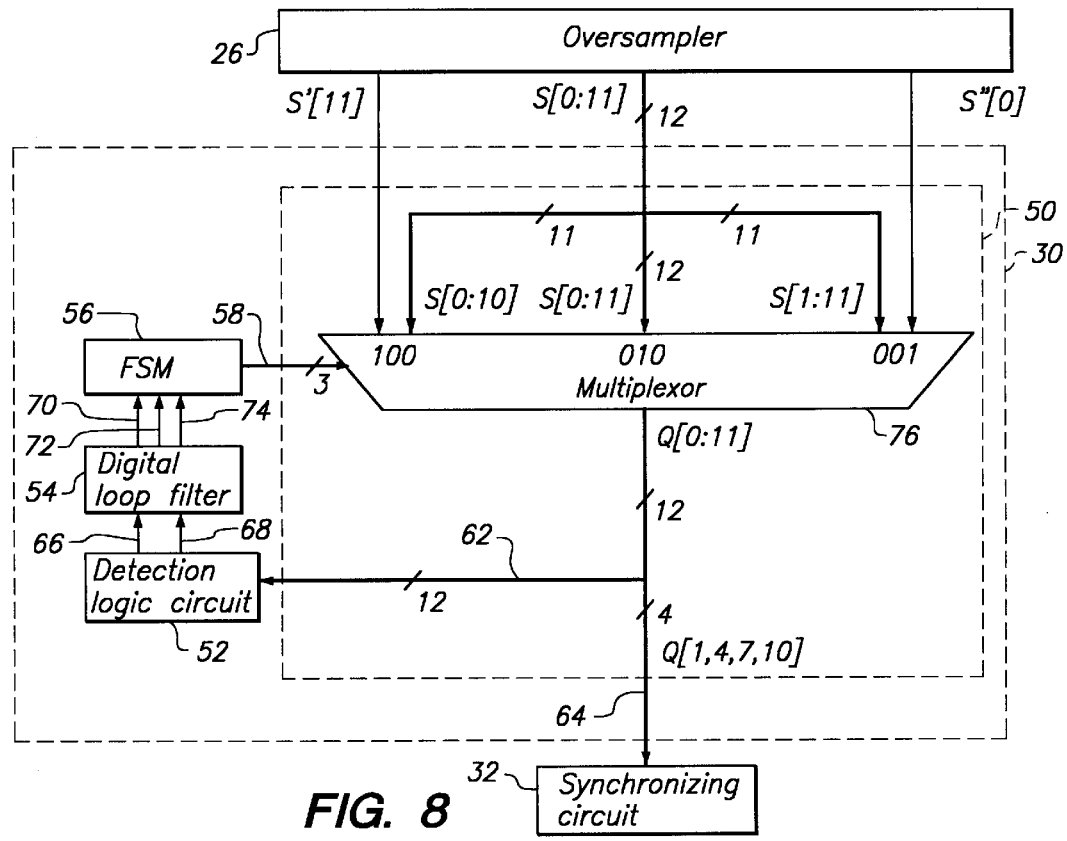
FIG. 8 depicts an example of a circuit to implement the phase aligning window of the present invention.

FIG. 8 depicts an example of a circuit to implement phase aligning window 50. Multiplexor 76 takes as input three 12-bit signals: one 12-bit signal comprising S'[11] and S[0:10]; one 12-bit signal comprising S[0:11]; and one 12 bit signal comprising S[1:11] and S"[0]. Multiplexor 76 selects among the three 12-bit signals according to the value of phase selection signal 58 and produces as output 12-bit signal 62 denoted as Q[0:11]. 12-bit signal 62 is then passed to phase detection logic circuit 52 for analysis, and the four bits denoted as Q[1, 4, 7 and 10] are passed to byte synchronizing circuit 32.

Phase Detection Logic Circuit

Figure 9:
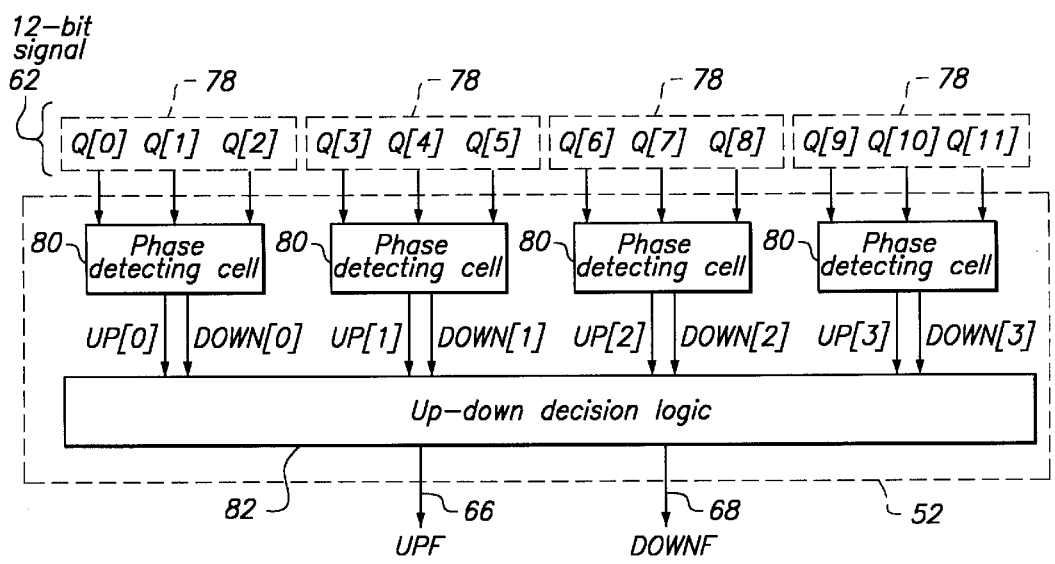
FIG. 9 depicts the operation of a phase detection logic circuit of the present invention.

FIG. 9 depicts the operation of phase detection logic circuit 52. Phase detection logic circuit 52 inspects 12-bit signal 62 to determine whether the signal is the subject of skew phase detection logic circuit 52 comprises a plurality of phase detecting cells 80 and up-down decision logic 82. Bits Q[0:11] are separated into N+1 bit groups 78 comprising three bits each. In a sample embodiment, N is equal to 3 and the 4 bit groups 78 comprise bits Q[0:2], Q[3:5], Q[6:8] and Q[9:11]. Each bit group 78 is provided to a phase-detecting cell 80.

Figures 10, 11:
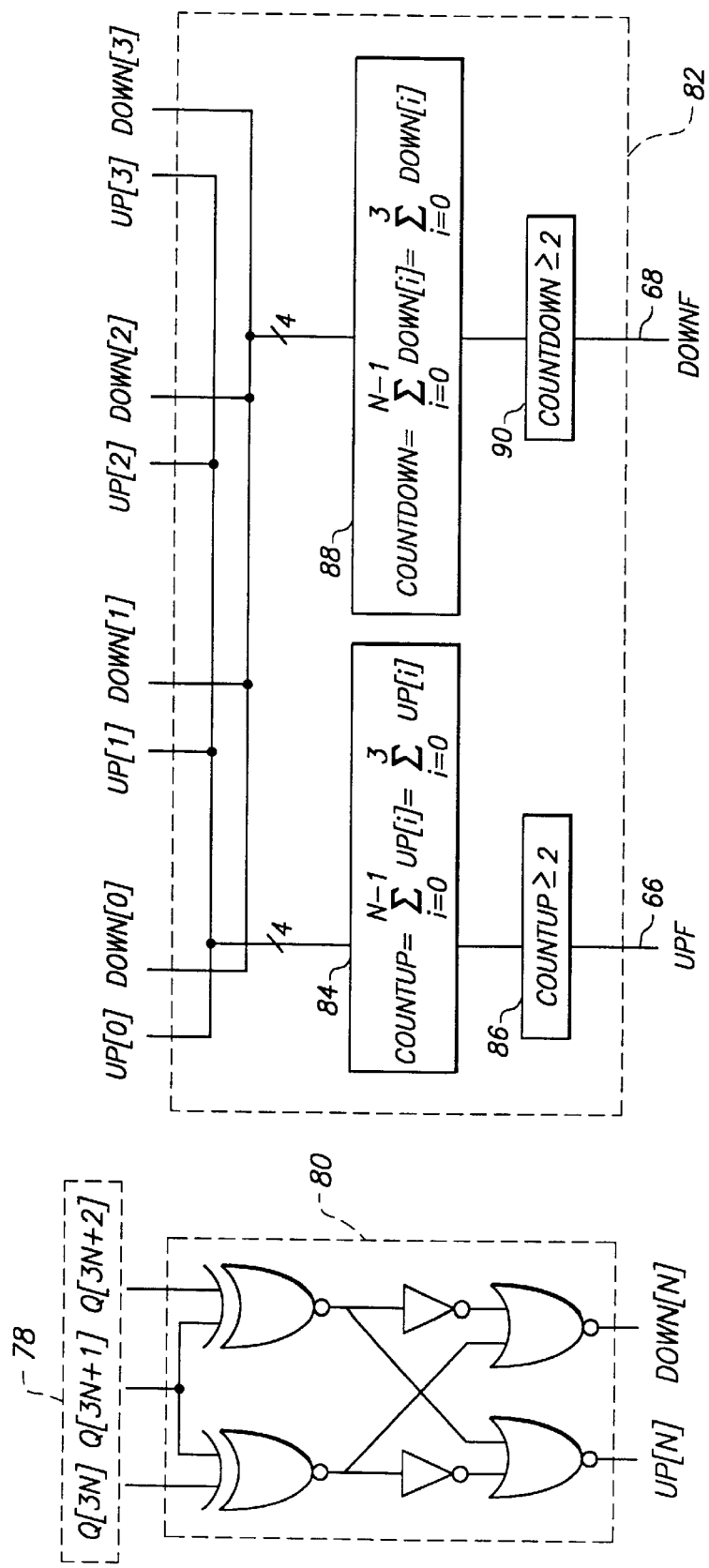
FIG. 10 depicts the operation of a phase-detecting cell of the present invention.
FIG. 11 depicts the operation of the up-down decision logic of the present invention

FIG. 10 depicts the operation of phase-detecting cell 80. The Nth phase detecting cell 80 takes as input a three-bit group 78 denoted as Q[3N], Q[3N+1] and Q[3N+2] where N is a value between 0 and 3 in the sample embodiment. For example, for N=2, a phase-detecting cell in the sample embodiment will take as input Q[6], Q[7] and Q[8].

If Q[3N], Q[3N+1] and Q[3N+2] all have the same binary value (i.e., all three signals are equal to '0' or all three signals are equal to '1'), UP[N] and DOWN[N] are set to '0' to indicate that no skew was detected for this bit group 78. If Q[3N] is equal in value to Q[3N+1], and different in value from Q[3N+2], UP[N] is set to logic value '0' and DOWN [N] is set to logic value '1', to indicate that a downward skew was detected for bit group 78. If Q[3N+1] is equal in value to Q[3N+2], and different in value from Q[3N], UP[N] is set to logic value '1' and DOWN[N] is set to logic value '0', to indicate that a downward skew was detected for bit group 78.

Following evaluation of all N+1 bit groups 78 to produce N+1 sets of UP[N] and DOWN[N] signals, up-down decision logic 82 evaluates the UP[N] and DOWN[N] signals to determine whether sufficient skew was detected to recommend a phase adjustment. FIG. 11 depicts the operation of up-down decision logic 82. Up-down decision logic 82 provides UP[0:N] as input to adder 84. Adder 84 sums the number of '1' signals asserted in the UP[0:N] signal set and provides the sum to comparator 86. Comparator 86 sets signal UPF 66 to a logic value '1' if the count is greater or equal to 2, and to logic value '0' otherwise. Likewise, up-down decision logic 82 provides DOWN[0:N] as input to adder 88. Adder 88 sums the number of '1' signals asserted in the DOWN[0:N] signal set and provides the sum to comparator 90. Comparator 90 sets signal DOWNF 68 to a logic value '1' if the count is greater or equal to 2, and to logic value '0' otherwise.

Referring again to FIG. 6, phase detection logic circuit 52 passes signal UPF 66 and signal DOWNF 68 to digital loop filter 54 for additional processing.

Digital Loop Filter

Digital loop filter 54 receives as input signal UPF 66 and signal DOWNF 68. When a predetermined number (e.g., four) of consecutive signals UPF 66 are received having a logic value '1', digital loop filter 54 sets signal UPT 70 to logic value '1' and sets signals HOLD 72 and DOWNT 74 to logic value '0'. When a predetermined number (e.g., four) of consecutive signals DOWNF 68 are received having a logic value '1', digital loop filter 54 sets signal DOWNT 74 to logic value '1' and sets signals HOLD 72 and UPT 70 to logic value '0'. When neither a predetermined number (e.g., four) of consecutive signals UPF 66 nor a predetermined number (e.g., four) of consecutive signals DOWNF 68 are received having a logic value '1', digital loop filter 54 sets signal HOLD 72 to logic value '1' and sets signals UPT 70 and DOWNT 74 to logic value '0'.

FIG. 12 depicts a state diagram for digital loop filter 54. Digital loop filter 54 operates in a plurality of states. Each operating state may be of a type H, type U, or type D. An H-type state is characterized by asserting a signal HOLD 72 with a logic value '1', asserting a signal UPT 70 having a logic value '0' and asserting a signal DOWNT 74 having a logic value '0'. A U-type state is characterized by asserting a signal HOLD 72 with a logic value '0', asserting a signal UPT 70 having a logic value '1' and asserting a signal DOWNT 74 having a logic value '0'. A D-type state is characterized by asserting a signal HOLD 72 with a logic value '0', asserting a signal UPT 70 having a logic value '0' and asserting a signal DOWNT 74 having a logic value '1'.

As shown in FIG. 12, digital loop filter 54 transits from state to state in response to received signals UPF 66 and DOWNF 68. Digital Loop Filter 54 initially begins execution in initial H-type state 102. In response to signal UPF 66 having a logic value '1', digital loop filter 54 transits to H-type state 104. Upon transiting to H-type state 104, digital loop filter 54 emits a HOLD signal 72 having a logic value '1', an UPT signal 70 having a logic value '0' and a DOWNT signal 74 having a logic value '0'. If digital loop filter 54 in H-type state 102 receives a signal DOWNF 68 having a logic value '1', digital loop filter 54 transits to H-type state 114. Upon transiting to H-type state 114, digital loop filter 54 emits a HOLD signal 72 having a logic value '1', an UPT signal 70 having a logic value '0' and a DOWNT signal 74 having a logic value '0'. It will be noted that in H-type states 104, 106 and 108, receipt of any instance of UPF signal 66 having a logic value '0' causes digital loop filter 54 to revert to initial H-type state 102. It will likewise be noted that in H-type states 114, 116 and 118, receipt of any instance of DOWNF signal 68 having a logic value '0' causes digital loop filter 54 to revert to initial H-type state 102.

After four consecutive instances of an UPF signal 66 having a logic value '1', digital loop filter 54 transits to U-type state 110. Upon transiting to U-type state 110, digital loop filter 54 emits a HOLD signal 72 having a logic value '0', an UPT signal 70 having a logic value '1' and a DOWNT signal 74 having a logic value '0'. In the next iteration, digital loop filter 54 transits to initial H-type state 102 regardless of the value of UPF signal 66.

Likewise, after four consecutive instances of an DOWNF signal 68 having a logic value '1', digital loop filter 54 transits to D-type state 120. Upon transiting to D-type state 120, digital loop filter 54 emits a HOLD signal 72 having a logic value '0', an UPT signal 70 having a logic value '0' and a DOWNT signal 74 having a logic value '1'. In the next iteration, digital loop filter 54 transits to initial H-type state 102 regardless of the value of DOWNF signal 68.

Figure 13:
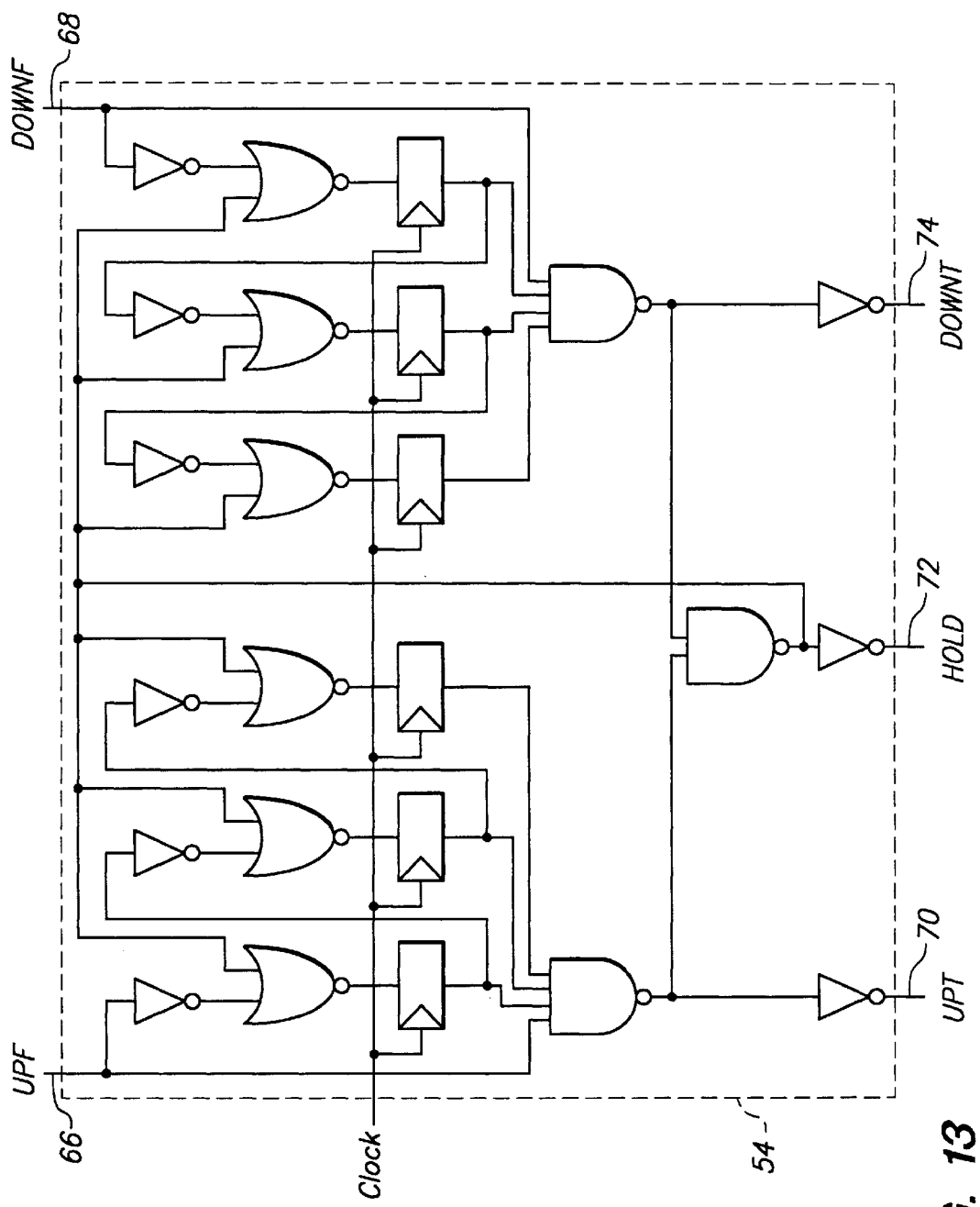
FIG. 13 depicts a logic diagram of a circuit implementing a digital loop filter of the present invention.

FIG. 13 depicts a logic diagram of a circuit implementing digital loop filter 54.

Phase-Adjusting Finite State Machine

Phase-adjusting finite state machine (FSM) 56 receives as input signal UPT 70, signal HOLD 72 and signal DOWNT 74. FSM 56 asserts as output a phase selection signal 58 that communicates to oversampler 26 whether to adjust its sampling as previously disclosed. Phase selection signal 58 is a tristate signal having a value indicating whether oversampler 26 should adjust its sampling upward, adjust its sampling downward, or maintain its current sampling. Phase selection signal 58 is most conveniently implemented by use of a three-bit signal, in which each bit corresponds to one of the possible states of the signal. For example, bit 0 of the three bits may indicate a request for an upward adjustment, bit 1 may be used to indicate a request to maintain the current sampling, and bit 2 may be used to request a downward adjustment.

FIG. 14 depicts a state diagram for FSM 56. FSM 56 54 operates in a plurality of states. A first operating state is phase0 state 150. Phase0 state 150 is characterized by asserting a phase selection signal 58 requesting a downward adjustment, e.g., having a logic value '100'. A second operating state is phase1 state 152. Phase1 state 152 is characterized by asserting a phase selection signal 58 requesting maintenance of the current sampling configuration, e.g., having a logic value '010'. A third operating state is phase2 state 154. Phase2 state 154 is characterized by asserting a phase selection signal 58 requesting an upward sampling adjustment, e.g., having a logic value '001'.

FSM 56 transits from one state to another state depending on the values of input signals UPT 70, HOLD 72 and DOWN 74 as shown in FIG. 14. As shown in FIG. 14, FSM transits from state Phase0 150 to state Phase1 152 in response to UPT signal 70 having a logic value '1' or to state Phase2 154 in response to DOWN signal 74 having a logic value '1'; otherwise (i.e., HOLD signal 72 having a logic value '1'), FSM 56 remains in state Phase0 150. Likewise, FSM 56 transits from state Phase1 152 to state Phase2 154 in response to UPT signal 70 having a logic value '1' or to state Phase0 150 in response to DOWNT signal 74 having a logic value '1'; otherwise (i.e., HOLD signal 72 having a logic value '1'), FSM 56 remains in state Phase1 152. Finally, FSM 56 transits from state Phase2 154 to state Phase0 150 in response to UPT signal 70 having a logic value '1' or to state Phase1 152 in response to DOWNT signal 74 having a logic value '1'; otherwise (i.e., HOLD signal 72 having a logic value '1'), FSM 56 remains in state Phase2 154.

Figure 15:
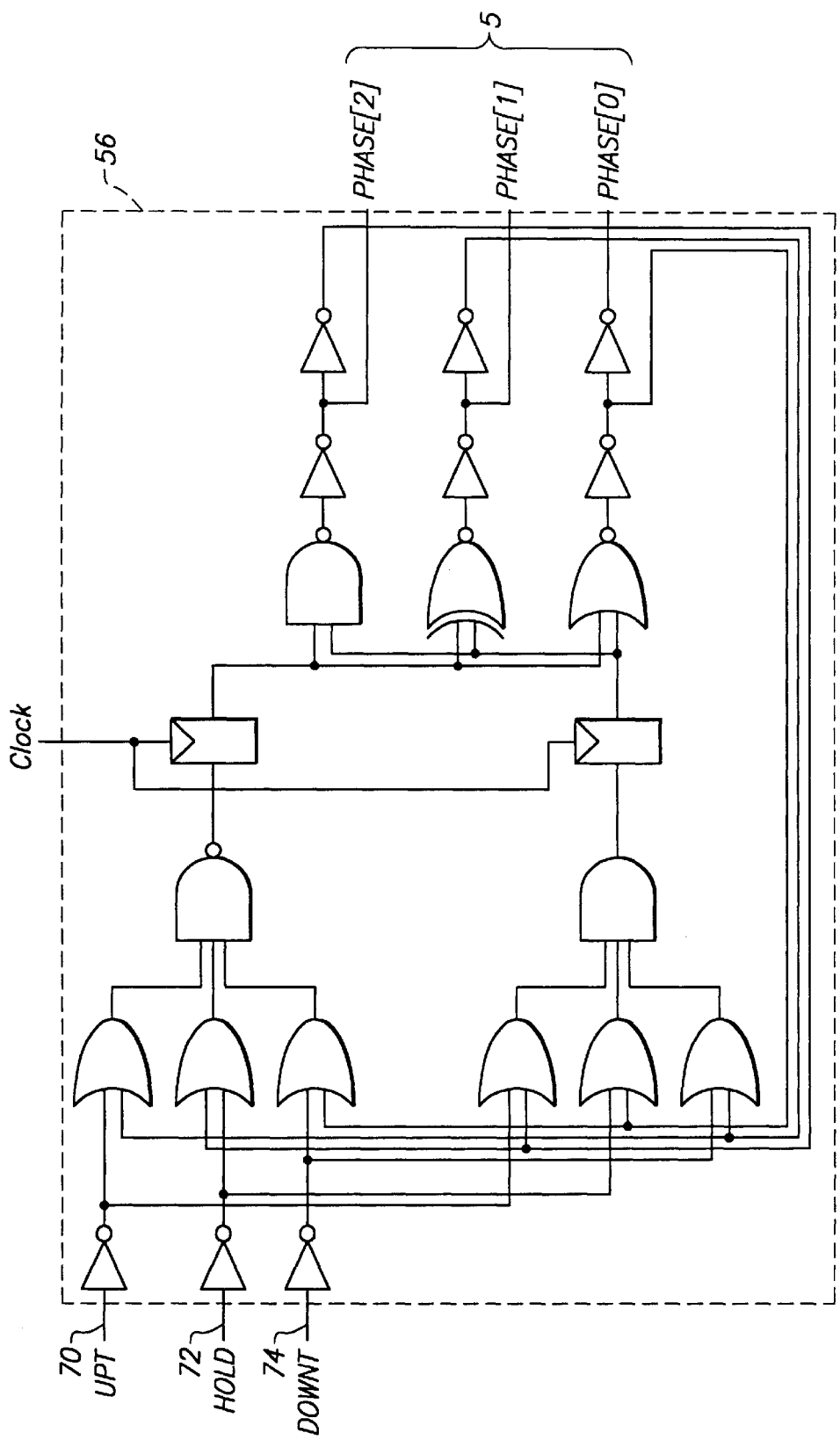
FIG. 15 depicts a logic diagram of a circuit implementing the finite state machine of the present invention.

FIG. 15 depicts a logic diagram of a circuit implementing FSM 56.

Digital Phase-Locked Loop Output

As previously described, and as depicted in FIGS. 7A through 7C, phase aligning window 50 selects a subset of bits from 14-bit input signal 60 in accordance with phase selection signal 58, and presents the subset as 12-bit output signal Q[0:11] 62. Additionally, as previously described a four-bit signal 64 comprising bits Q[1, 4, 7, and 10] is passed as output to frame synchronizing circuit 32.

Frame Synchronizing Circuit

Figure 16:
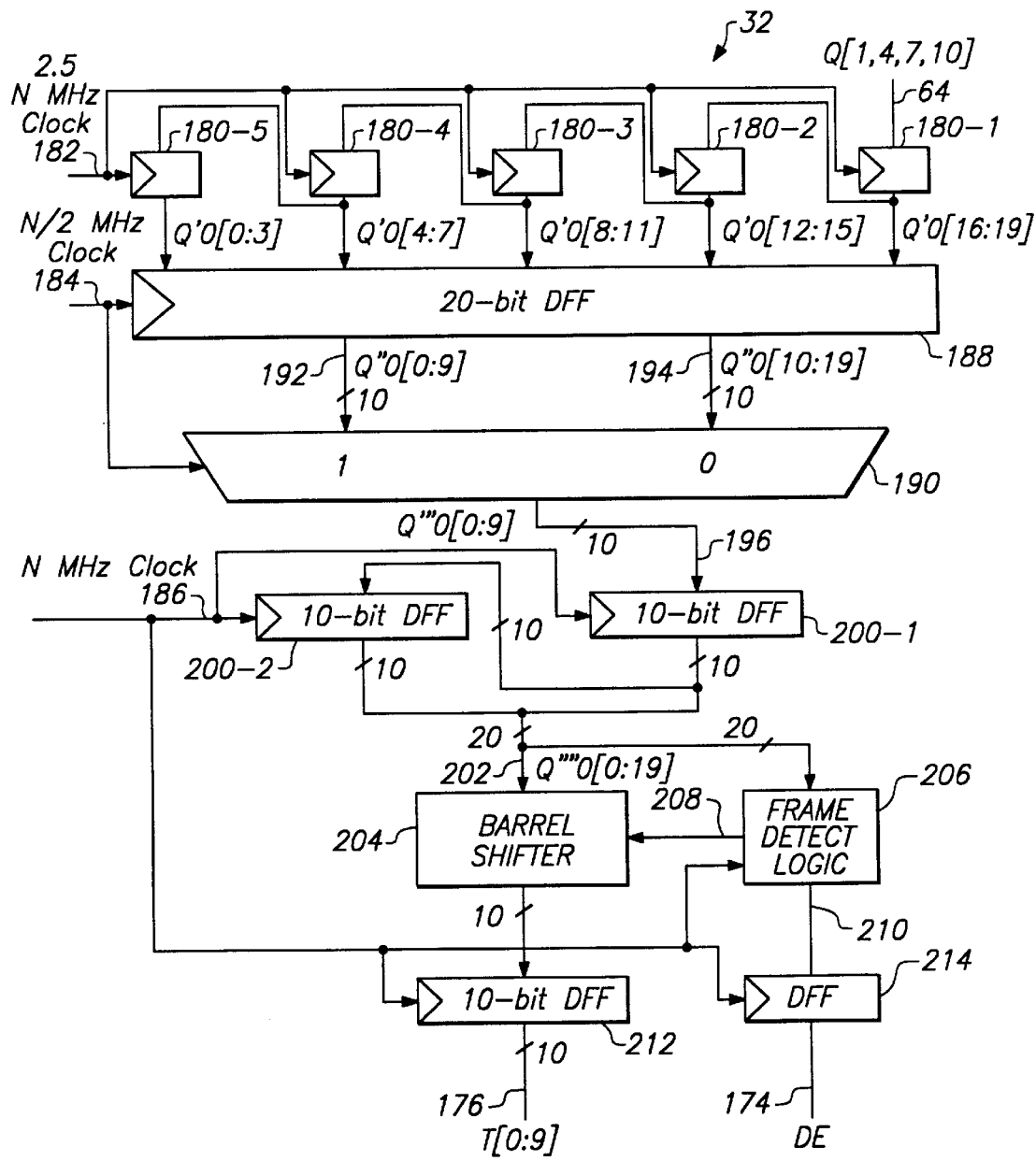
FIG. 16 depicts the frame synchronization circuit of the present invention.

FIG. 16 depicts a frame synchronization circuit 32 for use with the present invention. Frame synchronization circuit 32 takes as input a stream of multiple instances of 4-bit signal 64 and produces as output a stream of 10-bit encoded characters 176 and a data enable signal 174.

As shown in FIG. 16, frame synchronizer 32 operates under control of 2.5N MHz clock 182, N/2 MHz clock 184 and N MHz clock 186. Frame synchronizer 32 includes an array of 4-bit D-type flip flops (DFFs) 180-1 through 180-5. Frame synchronizer 32 takes as input signal Q[1,4,7,10] 64, which is placed in D-type flip-flop 180-1. In response to 2.5 NMHz clock signal 182 each DFF 180-1 through 180-4 transfers its contents to a respective adjacent DFF. That is, on each assertion of clock signal 182, the DFF 180-5 is loaded from DFF 180-4, DFF 180-4 is loaded from DFF 180-3, DFF 180-3 is loaded from DFF 180-2, DFF 180-2 is loaded from DFF 180-1, and DFF 180-1 is loaded from input signal Q[1.4.7.10] 64.

2.5N MHz clock 182 has five times the frequency of N/2 MHz clock 184. Accordingly, in synchronization with every fifth cycle of 2.5N MHz clock 182, N/2 MHz clock 184 is asserted. With each assertion of clock 184, 20-bit DFF 188 is loaded with the values present in 4-bit DFFs 180-1 through 180-5. The output of each DFF 180-1 through 180-5 is denoted as Q'[16:19], Q'[12:15], Q[8:11], Q'[4:7], and Q'[0:3], respectively. 20-bit DFF 188 asserts as output two 10-bit signals Q"[0:9] 192 and Q"[10:19] 194 to 20-to-10 multiplexor 190.

N/2 N MHz clock 184 additionally serves to control selection for 20-to-10 multiplexor 190, which produces as output 10-bit signal 196 denoted as Q'''[0:9]. As a result, when N/2 MHz clock 184 is firing, 10-bit signal 196 Q'''[0:9] is equal in value to 10-bit signal 192 Q"[0:9], and otherwise is equal in value to 10-bit signal 194 Q"[10:19].

In response to NMHz clock signal 186, 10-bit DFF 200-2 loads a 10-bit signal from 10-bit DFF 200-1 and 10-bit DFF 200-1 loads 10-bit signal Q"[0:9] 196 from 20-to-10 multiplexor 190. In addition, 10-bit DFF 200-1 and 10-bit DFF 200-2 each assert a 10-bit signal that together comprise 20-bit signal Q""[0:19] 202. 20-bit signal Q""[0:19] 202 is provided as input to barrel shifter 204 and frame detect logic 206.

Figure 17:
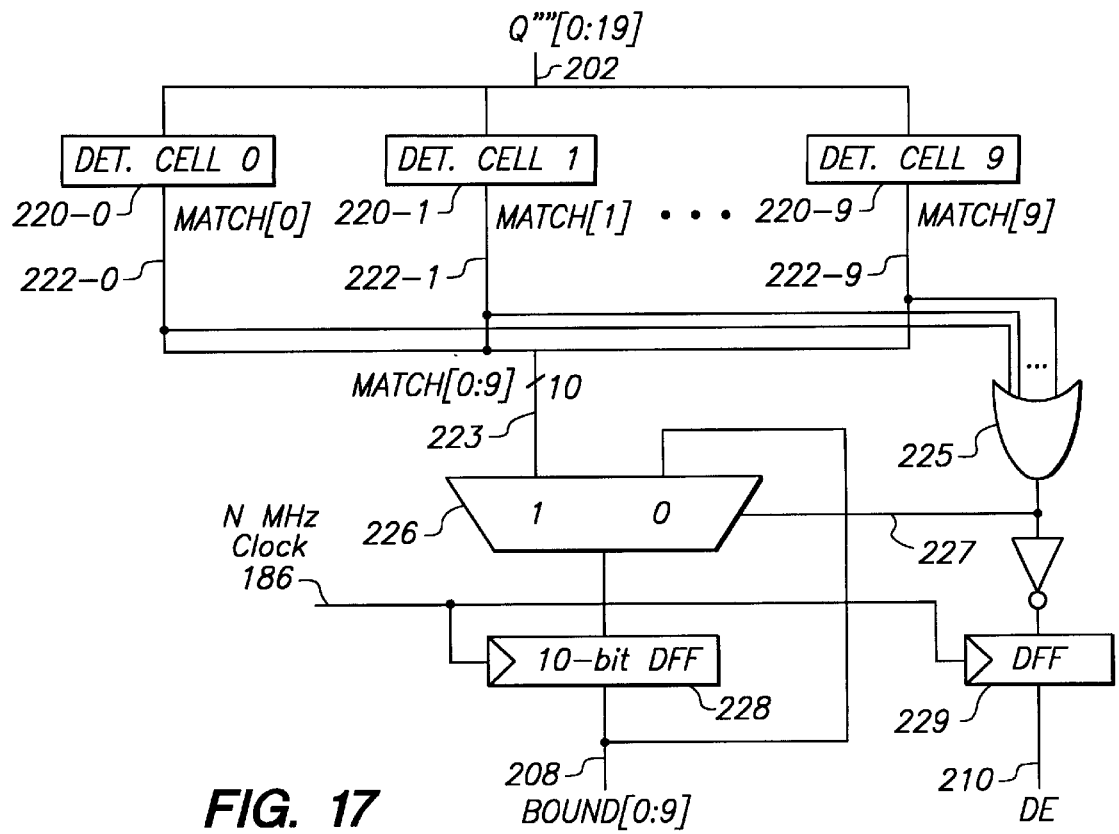
FIG. 17 depicts the frame detect logic of the present invention in further detail.

FIG. 17 depicts frame detect logic 206 in further detail. Frame detect logic 206 takes as input 20-bit signal Q""[0:19] 202 and produces as output 10-bit signal BOUND 208 and frame edge detect signal DE 210. Frame detect logic 206 includes an array of detection cells 220-0 through 220-9, each of which take as input 20-bit signal Q""[0:19] and produce as output a single bit MATCH[0] 222-0 through MATCH[9] 222-9 of 10-bit signal MATCH[0:9] 223. Each detection cell 220-0 through 220-9 sets its respective MATCH signal 220-0 through 220-9 to logic value '1' if the detection cell detects two consecutive frame edge characters embedded in 20-bit signal Q""[0:19] 202. A frame edge character is an out-of-band character defined as any of the 10-bit signals '1101010101', '101010100','0010101010' or '0010101011'. That is, a frame edge character is a 10-bit signal in which bits 0 and 1 have identical logic values, and in which the logic values of each bit N is not equal to the logic value of bit N−1, for N=2 through 8.

Figure 18:
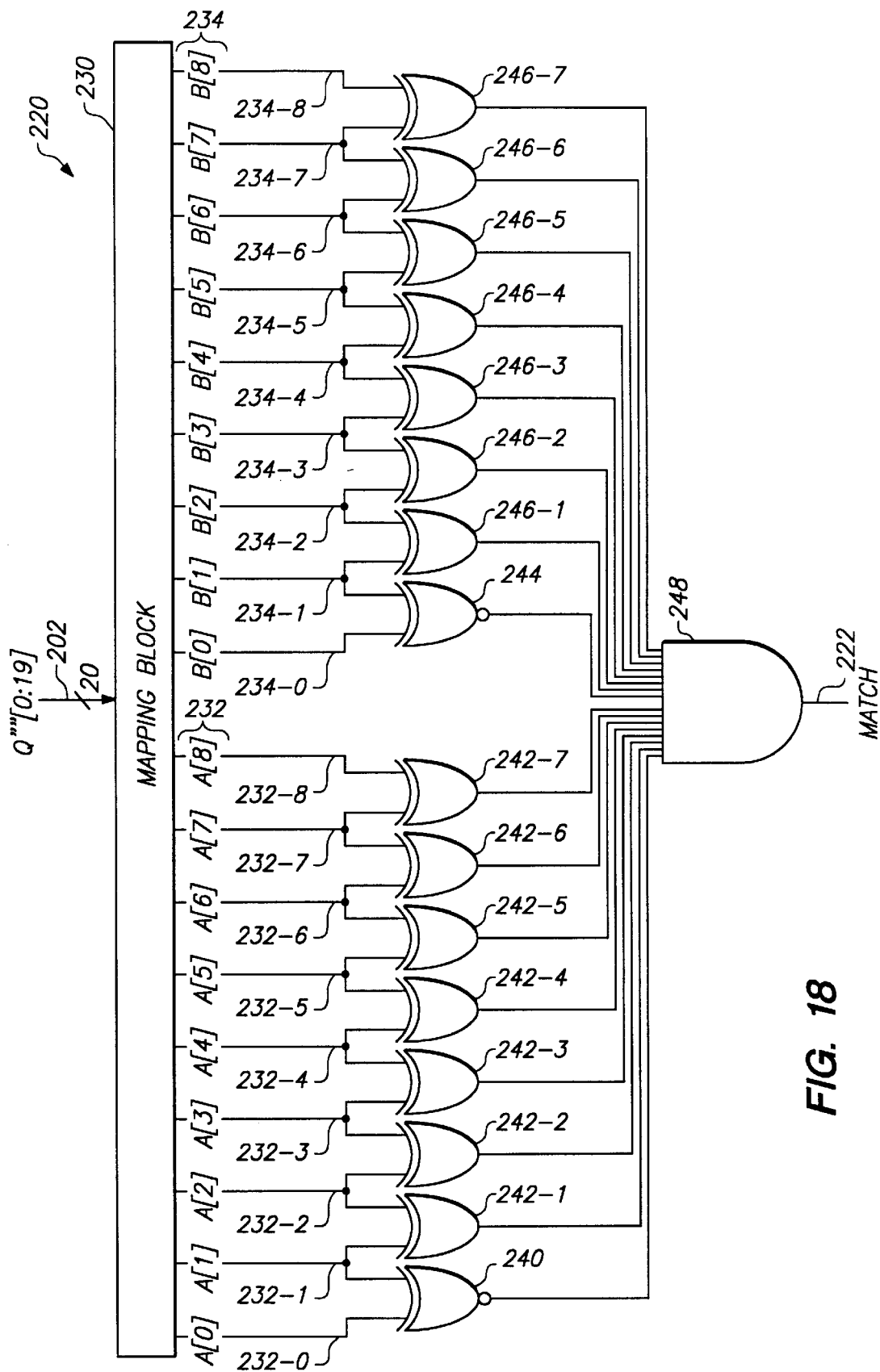
FIG. 18 depicts the detection cell of the present invention in detail.

FIG. 18 depicts a detection cell 220 in detail. 20-bit signal Q""[0:19] 202 is supplied as input to mapping block 230. Mapping block 230 selects adjacent bits from 20-bit signal 202 and produces them as two 9-bit signals A[0:8] 232 (comprising signals 232-0 through 232-8) and B[0:8] 234 (comprising signals 234-0 through 234-8). The bits selected by mapping block 230 for detection cell 0 220-0 through mapping block 230 for detection cell 9 220-9 is shown by the chart in FIG. 19.

Detection cell 220 analyzes A[0:8] 232 and B[0:8] to determine whether a frame indicator character has been detected. XNOR gate 240 takes as input A[0] 232-0 and A[1] 232-1, and produces a logic value '1' if the two inputs are identical. XOR gates 242-1 through 242-7 each take as input adjacent bits A[1] 232-1 through A[8] 232-8 and each produce a logic value '1' if the two input values are not equal. B[0:8] is likewise analyzed. That is, XNOR gate 244 takes as input B[0] 234-0 and B[1] 234-1, and produces a logic value '1' if the two inputs are identical. XOR gates 246-1 through 246-7 each take as input adjacent bits B[1] 234-1 through B[8] 234-8 and each produce a logic value '1' if the two input values are not equal. The output of XNOR gate 240, XOR gates 242-1 through 242-7, XNOR gate 244 and XOR gates 246-1 through 246-7 are presented as input to AND gate 248. AND gate produces as output 1-bit MATCH signal 222. If all bits are 1, MATCH signal 222 has a logic value '1', indicating that two frame edge characters have been detected.

Referring again to FIG. 17, MATCH signals 220-0 through 220-9 are joined to form 10-bit signal MATCH[0:9] 223, which is presented as input to 10-bit multiplexor 226. MATCH signals 220-0 through 220-9 are also provides as input to OR gate 225. OR gate 225 produces as output a control signal 227 for 10-bit multiplexor 226. If any detecting cell 220-0 through 220-9 has detected a frame start condition, OR gate 225 will produce as output a logic value '1', causing multiplexor 226 to select signal MATCH[0:9] as output. If a frame edge has not been detected, multiplexor 226 instead produces as output the same signal as during the previous NMHz clock signal. This is accomplished by providing multiplexor 226 output to 10-bit DFF 228. DFF 228 is loaded under control of N MHz clock 186. The output of DFF 228 is presented as input to multiplexor 226 for selection when control signal 227 has logic value '0'.

The output of 10-bit DFF 228 is additionally produced as output signal BOUND[0:9] 208. The output of OR gate 225 is inverted and provided to DFF 229, clocked synchronously with 10-bit DFF 228 under control of N MHz clock 186. The output of DFF 229 is presented as data enable signal 210.

Referring again to FIG. 16, 10-bit signal BOUND[0:9] 208 is provided as a control signal to barrel shifter 204. Barrel shifter 204 takes as input 20-bit signal Q""[0:19] 202. Barrel shifter 204 performs a left shift of 20-bit signal Q""[0:19] 202 under control of 10-bit signal BOUND[0:9] 208. Specifically, barrel shifter 204 left-shifts 20-bit signal Q""[0:19] 202 and 10-bit signal BOUND[0:9] 208 simultaneously until the first bit of 10-bit signal BOUND[0:9] 208 has logic value '1'. That is barrel shifter 204 left-shifts 20-bit signal Q""[0:19] 202 the number of bit positions equal to the number of leading logic value '0's in 10-bit signal BOUND[0:9] 208.

Under control of N MHz clock 186, 10-bit DFF 212 loads 10 bits from barrel shifter 204, and produces as output 10-bit signal T[0:9] 176. In the same clock cycle, also under control of N MHz clock 186, DFF 214 loads 1-bit DE signal 210 from frame detect logic 206 and produces as output DE signal 174.

DE signal 174 may be used to synchronize multiple parallel serial streams of 10-bit signal T[0:9] 176 by interchannel synchronizer 34, as will be more fully described.

Inter-channel Synchronization

Figure 20:
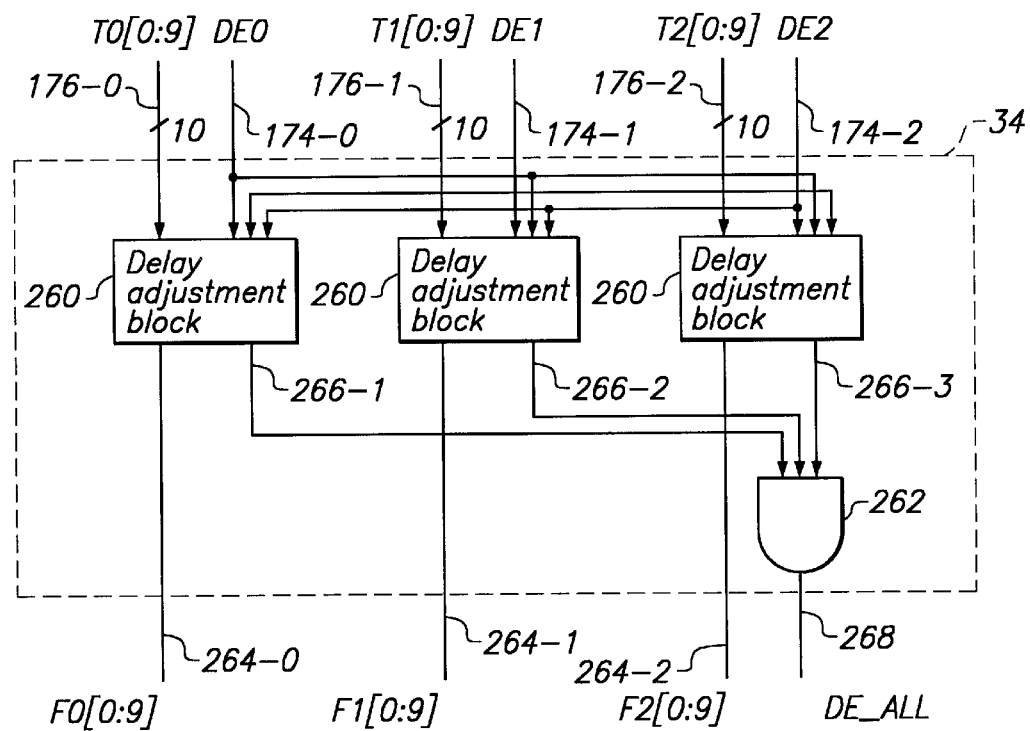
FIG. 20 depicts the interchannel synchronizer of the present invention.

FIG. 20 depicts the interchannel synchronizer 24 of the present invention. Interchannel synchronizer 34 takes as input a plurality of 10-bit signals T[0:9] 176, one such signal per channel, and a plurality of 1-bit DE signals 174, one such signal per channel. In the depicted three-channel configuration, three 10-bit signals T0[0:9] 176-0, T1[0:9] 176-1 and T2[0:9] 176-2, and three 1-bit DE signals DE0 174-0, DE1 174-2 and DE2 174-2 are received as input.

Figure 21:
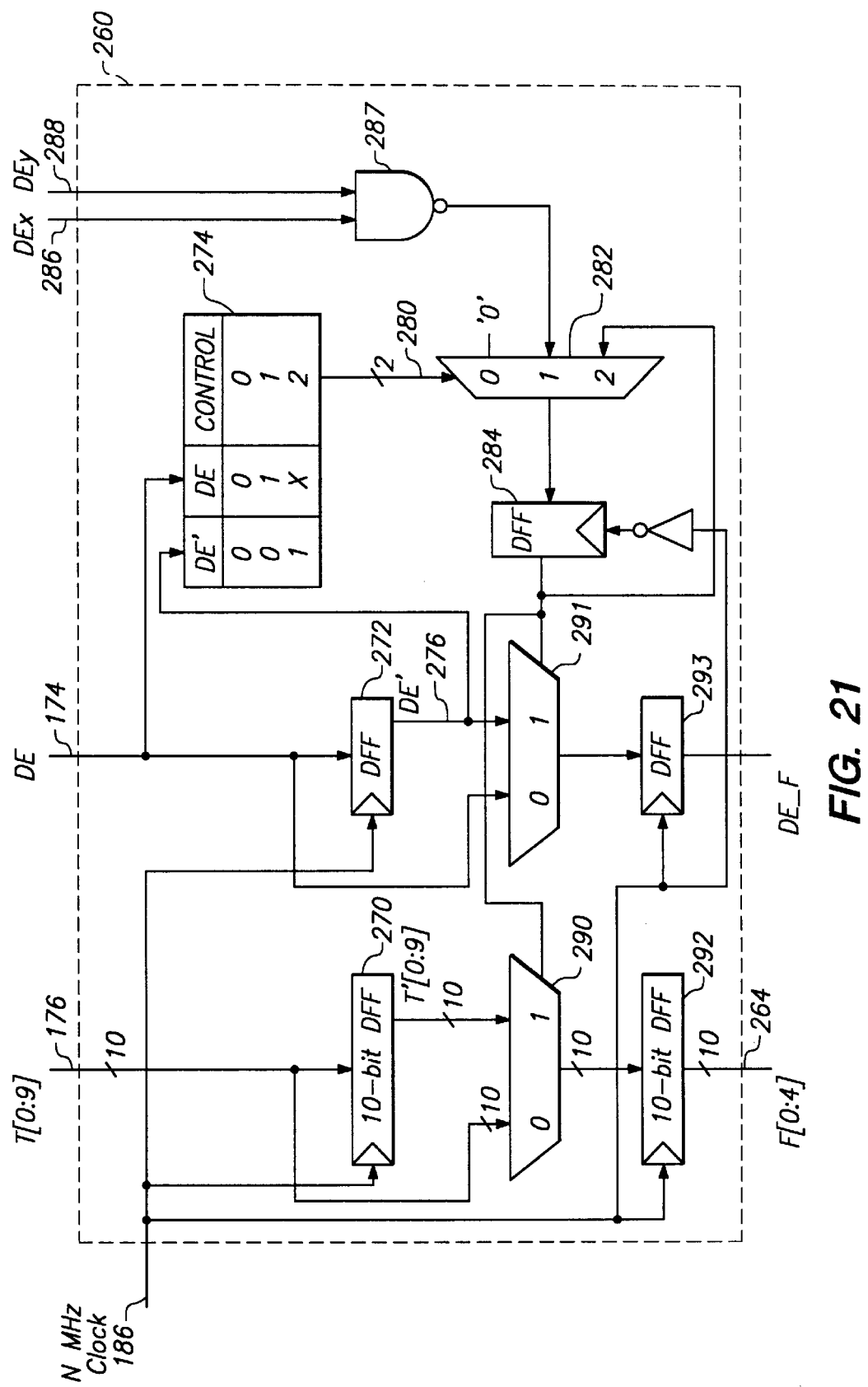
FIG. 21 depicts the delay adjustment block of the present invention in detail.

Interchannel synchronizer 34 includes a plurality of delay adjustment blocks 260, one per channel. FIG. 21 depicts delay adjustment block 260 in detail. Each delay adjustment block 260 takes as input one of 10-bit signals T[0:9] 174 and all of DE signals 174. Each delay adjustment block 260 produces as output 10-bit signal F[0:9] 264 and data enable signal DE_F 266. 10-bit signal F[0:9] is selectively delayed until it is in synchronization with its associated signals as indicated by data enable signals for those associated signals.

Under control of N Mhz clock 186 10-bit DFF 270 loads T[0:9] 176 and 1-bit DFF 272 loads DE 174. Delay adjustment block 260 also takes as input the DE values corresponding to the other channels, shown as signal DEx 186 and DEy 288. For example, a delay adjustment block 260 for processing channel 0 would take 10-bit signal T0[0:9] 176-0 for T[0:9] 176 and DE0 signal 174-0 for DE signal 174, and would take DE1 signal 176-1 for DEx 286 and DE2 signal 176-2 for DEy 288.

Delay decision logic block 274 takes as input the previous value of DE 174, denoted as DE'276 and current value of DE 174. Delay decision logic block 274 produces as output a tristate control signal 280, depending on the values of DE and DE'. If DE' has logic value '0', then control signal 280 has the same value of DE 174. If DE' has logic value '1', the control signal 280 has value '2'. Control signal 280 is used to control three-way multiplexor 282, which outputs a signal to be loaded to DFF 284. If control signal 280 has logic value '0', DFF 284 is loaded with a logic '0'. If control signal 280 has a logic value '1', DFF 284 is loaded with a value resulting from applying the other DE signals DEx 286 and DEy 288 to NAND gate 287. If control signal 280 has a logic value '2', DFF 284's contents are maintained unchanged.

The value from DFF 284 is used to control 10-way multiplexor 290 and multiplexor 291. When DFF 284 has logic value '0', 10-way multiplexor 290 selects 10-bit signal 176, which is loaded into 10-bit DFF 292 on the next cycle of clock 186. Otherwise, when DFF 284 has logic value '1', 10-way multiplexor 290 selects 10-bit signal T'[0:9], having a value of 10-bit signal 176 delayed by one clock cycle, and which is loaded into 10-bit DFF 292 on the next cycle of clock 186. Likewise, When DFF 284 has logic value '0', 10-way multiplexor 291 selects DE signal 174, which is loaded into. DFF 293 on the next cycle of clock 186. Otherwise, when DFF 284 has logic value '1', multiplexor 291 selects DE' signal 276, having a value of DE signal 174 delayed by one clock cycle, and which is loaded into. DFF 293 on the next cycle of clock 186. The contents of 10-bit DFF are output as 10-bit signal F[0:9] 264 and as data enable signal DE_F 266, indicating the validity of 10-bit signal 264. Referring again to FIG. 20, the plurality of signals 264-0, 264-1 and 264-2 provide synchronized parallel encoded characters. DE_F signals 266-1, 266-2 and 266-3 are high when the contents of all three 10-bit signals are valid. The three DE_F signals 266-1, 266-2 and 266-3 are ANDed together by AND gate 262, which produced composite DF signal 268, having a logic value '1' when all 10-bit signals are valid and in synchronization.

After synchronization, synchronized 10-bit signals F0 264-0, F1 264-1 and F2 264-2 may be provided to a 10B/8B binary decoder to translate the 10-bit-encoded signals to 8-bit characters for use in a computer system using 8 bits per character, e.g., ASCII, BCD or EBCDIC.

Figure 22:
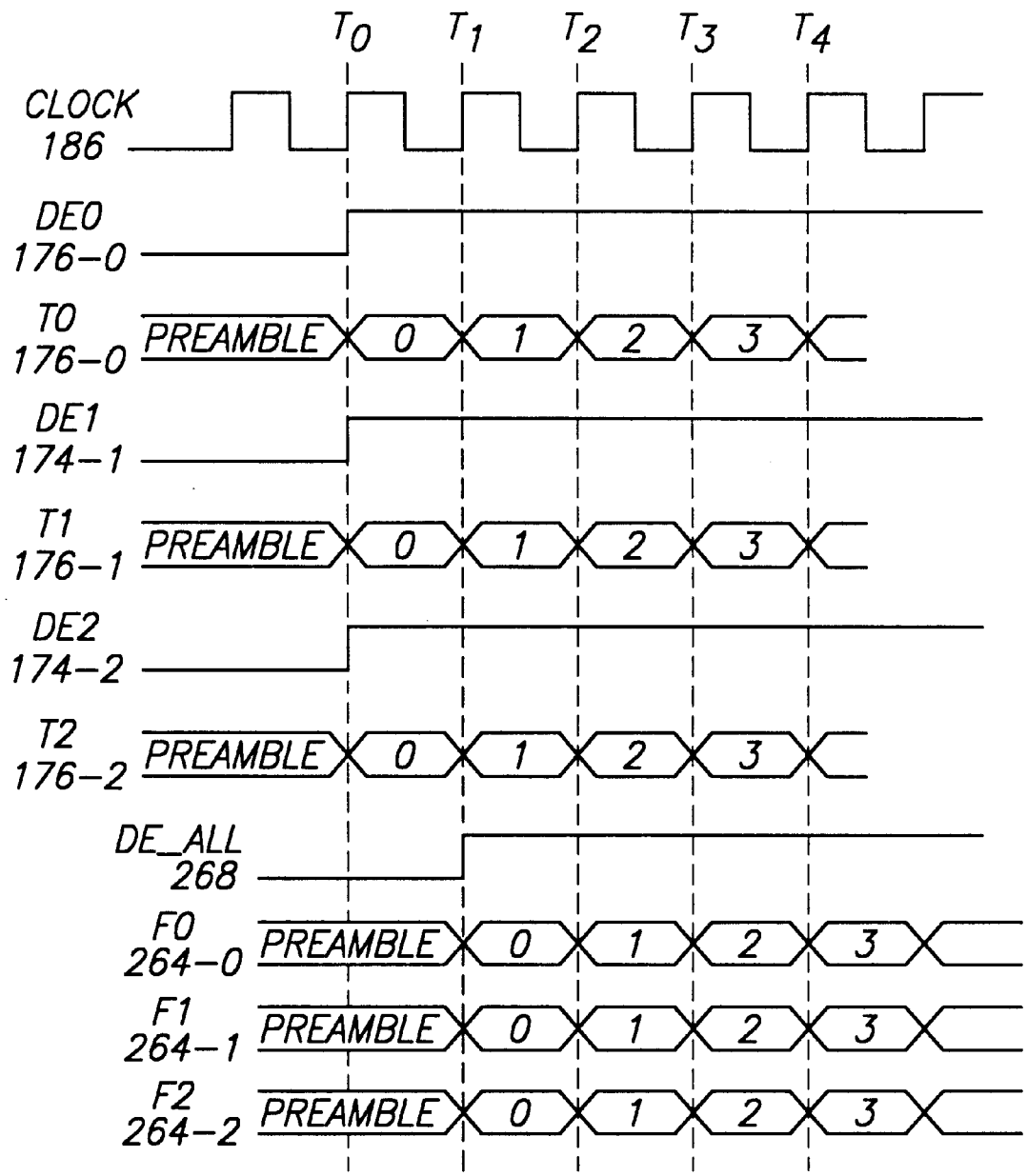
FIG. 22 depicts a timeline for the synchronization block of the present invention in normal operation.

FIG. 22 depicts a timeline for synchronization block 34 in normal operation, that is, where no 10-bit signal need to be delayed. Each of 10-bit signals 176-0, 176-1 and 176-2 are already in synch, as shown by their respective data enable signals 174-0, 174-1 and 174-2. Each signal is uniformly delayed by one clock cycle, as shown by 10-bit signals 264-0, 264-1 and 264-2.

Figure 23:
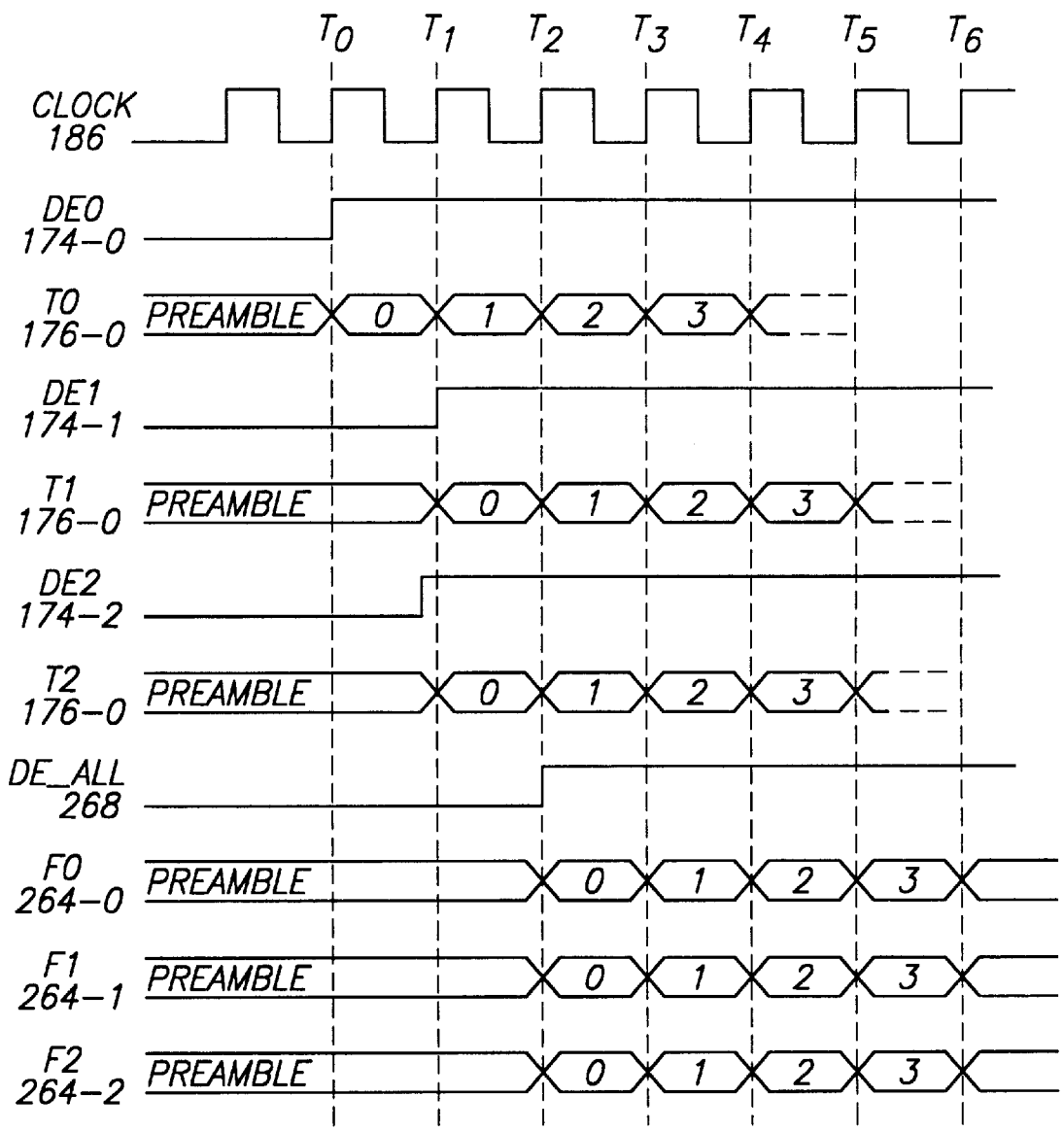
FIG. 23 depicts a timeline for the synchronization block of the present invention where one 10-bit signal is arriving early.

FIG. 23 depicts a timeline for synchronization block 34 in where one 10-bit signal is arriving early. 10-bit signal 176-0 is shown arriving one clock cycle ahead of 10-bit signals 176-1 and 176-2. This is known because at time T0, data enable signal 174-0 is high, while data enable signals 174-1 and 174-2 are set low. 10-bit signal DE0 174-0 is therefore delayed an additional clock cycle beyond 10-bit signals 176-1 and 176-2, so that all of 10-bit signals F0 264-0, F1 264-1 and F2 264-2 are produced in synchronization at time T2.

What is claimed is:

1. A digital phase-locked loop comprising: a phase aligning window, responsive to a phase alignment value, for receiving as input a plurality of oversampled bits, deriving a plurality of phase-aligned oversampled bits by adjusting a window according to said phase alignment value, and providing said plurality of phase-aligned oversampled bits as output;

a phase detection circuit for receiving as input said plurality of phase-aligned oversampled bits and producing as output a set of composite phase signals, said phase detection circuit including:
      a plurality of phase-detecting cells, each of said phase-detecting cells receiving as input one of said plurality of phase-aligned oversampled bits determining a phase condition for said one of said plurality of phase-aligned oversampled bits and producing as output one of a plurality of sets of phase signals indicative of said phase condition;
      an up-down decision circuit receiving as input said plurality of sets of phase signals from the plurality of phase-detecting cells, and producing as output a set of composite phase signals;
   a digital filter receiving as input a series of sets of composite phase signals from the up-down decision circuit, and producing as output a set of phase adjustment recommendation signals; and
   a phase-adjusting finite state machine (FSM) receiving as input said set of phase adjustment recommendation signals and producing as output said phase alignment value.

2. An apparatus for detecting a phase condition in a serial stream of bits, said apparatus comprising:

a phase detection circuit receiving as input a plurality of groups of sampled binary signals, each group corresponding to one bit of the serial stream and producing as output a phase detection signal resulting from an analysis of the plurality of groups at once and in parallel, said phase detection logic circuit including:
      (a) a plurality of phase-detecting cells, each of said phase-detecting cells (i) receiving as input one of the plurality of groups of sampled binary signals, (ii) determining a phase condition for said one of the plurality of groups, and (iii) producing as output one of a plurality of sets of phase signals indicative of said phase condition;
      (b) an up-down decision circuit (i) receiving as input said plurality of sets of phase signals, and (ii) producing as output a set of composite phase signals.

3. The digital phase-locked loop in claim 1, where said digital phase-locked loop operates within a system where each group corresponds to a bit of a multibit character.

4. The digital phase-locked loop in claim 1, where said digital phase-locked loop operates within a system for processing and displaying video data.

5. The apparatus for detecting a phase condition in claim 2, where said apparatus operates in cooperation with an apparatus that adjusts a phase of a clock which determines sampling of the serial stream.

6. A digital phase-locked loop in a system receiving a stream of bits, each bit being oversampled to generate a group of digital samples, the loop comprising:

a phase aligning window adapted to (a) receive as input (i) a plurality of groups of digital samples, (ii) a first sample of a group of digital samples which is subsequent to the plurality of groups of digital samples, and (iii) a last sample of a group of digital samples which precedes the plurality of groups of digital samples, (b) derive a plurality of groups of phase-aligned digital samples according to a phase selection signal, and (c) provide as output the plurality of groups of phase-aligned digital samples;

a phase detection circuit adapted to (a) receive as input the plurality of groups of phase-aligned digital samples, (b) derive composite phase-detection signals indicative of skew in the plurality of groups of phase-aligned digital samples, and (c) provide as output the composite phase-detection signals;

a digital filter adapted to (a) receive as input the composite phase-detection signals, (b) derive phase-adjustment signals, and (c) provide as output the phase-adjustment signals; and a finite state machine adapted to (a) receive as input the phase-adjustment signals, (b) derive a next phase-selection signal which corresponds to a next plurality of groups of digital samples, and (c) provide the next phase-selection signal to the phase aligning window.

7. The apparatus of claim 2, wherein said one of the plurality of sets of phase signals output by each said cell comprises a first bit for indicating presence of upward skew in said one of the groups of sampled binary signals, and a second bit for indicating presence of downward skew in said one of the groups of sampled binary signals.

8. The apparatus of claim 7, wherein each of the groups of sampled binary signals comprises three sampled binary signals.

9. The apparatus of claim 8, wherein the first bit is set to indicate the presence of upward skew if a third sampled binary signal differs in value from a first and a second sampled binary signals, and wherein the second bit is set to indicate the presence of downward skew if the first sampled binary signal differs in value from the second and the third sampled binary signals.

10. The apparatus of claim 2, wherein the set of composite phase signals output by said up-down decision circuit comprises a first bit for indicating presence of an upward skew in the plurality of groups of sampled binary signals as a whole, and a second bit for indicating presence of a downward skew in the plurality of groups of sampled binary signals as a whole.

11. The apparatus of claim 10, wherein the first bit is set to indicate the presence of upward skew if upward skew is indicated in a plurality of the groups of sampled binary signals, and the second bit is set to indicate the presence of downward skew if downward skew is indicated in a plurality of the groups of sampled binary signals.

12. The apparatus of claim 1, wherein the phase adjustment recommendation signals output by the digital filter comprise a first bit for recommending an upward phase adjustment and a second bit for recommending a downward phase adjustment.

13. The apparatus of claim 2, wherein the first bit is set to recommend the upward phase adjustment if a predetermined number of consecutive upward skews are indicated by the phase-detection circuit, and the second bit is set to recommend the downward phase adjustment if a predetermined number of consecutive downward skews are indicated by the phase-detection circuit.

14. The apparatus of claim 2, wherein the finite state machine comprises three states including a first state for indicating that the window should be adjusted upward, a second state for indicating that the window adjusted downward, and a third state for indicating that the window should be maintained.

15. The apparatus of claim 14, wherein the phase alignment value comprises a tristate signal whose states correspond to the three states of the finite state machine.

16. The apparatus of claim 15, wherein the finite state machine changes state depending on the values of the first bit and the second bit.

17. A method for detecting phase error comprising:

oversampling a data signal to generate a string of binary samples;

combining a binary sample from a previous oversampling operation and a binary sample from a next oversampling operation with the bit string to create a composite string of binary samples selecting a subset of the composite string in response to a phase selection signal;

dividing the selected subset of the composite string into groups of binary samples having a first, second, and third binary sample;

selecting one of the groups of binary samples;

responsive to all of the binary samples in the selected group having a same binary value, generating a control signal to indicate no skew is detected;

responsive to the first bit and the second bit in the selected group having the same binary value, and the third bit having a different binary value, generating a control signal indicating that a downward skew is detected;

responsive to the second bit and the third bit in the selected group having the same binary value, and the first bit having the different binary value, generating a control signal indicating that an upward skew is detected;

repeating the selecting, analyzing, and generating steps for each group of sampled binary values; and generating a phase error signal in response to the control signals generated from each group.

18. The method of claim 17 further comprising:

for each subset of the composite bit string, storing the control signal generated from each group of sampled binary values;

generating a phase error signal indicating an upward skew in response to at least two of the groups having a control signal indicating an upward skew is detected;

generating a phase error signal indicating a downward skew response to at least two of the groups having a control signal indicating an downward skew is detected; and generating a phase error signal indicating no skew in response to any other combination of control signals.

19. The method of claim 18 comprising the steps of:

generating an upward phase shift recommendation signal in response to receiving four consecutive phase error signals indicating an upward skew;

generating an downward phase shift recommendation signal in response to receiving four consecutive phase error signals indicating a downward skew;

generating an no phase shift recommendation signal otherwise.

20. A phase aligning circuit, in a system where data bits are oversampled to generate sets of samples of each bit, and for each set of bits a skew value is generated indicating the type and existence of skew, the circuit comprising:

a digital filter receiving a plurality of skew values and producing three types of phase-adjustment signals in response to the skew values, wherein an up signal is generated in response to an up skew value being received multiple times in succession, a down skew value is generated in response to a down skew value being received multiple times in succession, and a no-skew value is generated otherwise; and a finite state machine, having a plurality of states, for receiving the phase-adjustment signals, wherein an up state of the finite state machine generates a control signal which directs a phase aligning window to select a high set of bits, a down state generates a control signal which directs a phase aligning window to select a low set of bits, and a hold state directs the phase aligning window to select a middle set of bits, and wherein the finite state machine transitions to an up state in response to receiving an up signal when in a hold state, transitions to a down state in response to receiving an down signal when in a hold state, transitions to a hold state in response to receiving an up signal when in a down state, and transitions to a hold state in response to receiving a down signal when in an up state.

* * * * *